United States Patent
Swink et al.

(10) Patent No.: US 8,924,893 B2
(45) Date of Patent: Dec. 30, 2014

(54) LOCKING AND UNLOCKING OF AN ELECTRONIC DEVICE USING A SLOPED LOCK TRACK

(75) Inventors: Cristy Swink, Milton, GA (US); Jason Sikes, Carnation, WA (US); Eric Brady Burns, San Francisco, CA (US); Alex Tam, San Francisco, CA (US); Harry Lawson Kight, San Francisco, CA (US); Ratna Desai, Oakland, CA (US); Alison Rae Maiorano, San Francisco, CA (US); Katrin Asen, Munich (DE); Philip Foeckler, Richmond, CA (US); Benjamin Fineman, San Francisco, CA (US); Jennifer Siu Bettendorff, San Francisco, CA (US); Sheldon Pacotti, Austin, TX (US); Joseph Filani, Austin, TX (US); Philip Brock, Santa Clara, CA (US); Jonathan Solis Snydal, Oakland, CA (US)

(73) Assignee: AT&T Mobility II LLC, Atlanta, GA (US)

(*) Notice: Subject to any disclaimer, the term of this patent is extended or adjusted under 35 U.S.C. 154(b) by 181 days.

(21) Appl. No.: 12/902,979

(22) Filed: Oct. 12, 2010

(65) Prior Publication Data

US 2011/0088086 A1 Apr. 14, 2011

Related U.S. Application Data

(63) Continuation-in-part of application No. 12/643,726, filed on Dec. 21, 2009.

(60) Provisional application No. 61/251,717, filed on Oct. 14, 2009.

(51) Int. Cl.
*G06F 3/033* (2013.01)

(Continued)

(52) U.S. Cl.
CPC ............ *G06F 3/04883* (2013.01); *G06F 21/31* (2013.01); *H04M 1/72519* (2013.01);

(Continued)

(58) Field of Classification Search
USPC .................................................. 715/863, 702
See application file for complete search history.

(56) References Cited

U.S. PATENT DOCUMENTS 5,072,412 A 12/1991 Henderson, Jr. et al.
5,233,687 A 8/1993 Henderson, Jr. et al.

(Continued)

FOREIGN PATENT DOCUMENTS

WO 2008107675 9/2008

OTHER PUBLICATIONS

OA dated Nov. 14, 2011 for U.S. Appl. No. 12/643,726, 59 pages.

(Continued)

*Primary Examiner* — Kieu Vu
*Assistant Examiner* — Aaron Lowenberger
(74) *Attorney, Agent, or Firm* — Amin, Turocy & Watson, LLP

(57) ABSTRACT

Systems, apparatuses, and methods that can facilitate securing an electronic device and associated information are presented. A security component facilitates display and operation of a lock track comprising a locked portion having a positive slope and an unlocked portion, including a chasm, that is adjacent to a high point of the positive-sloped unlocked portion of the lock track. A lock facilitator component (LFC) can be moved along the track between a low point of the locked portion and the unlocked portion. The LFC can be moved in response to received input, and if the input is not sufficient to move the LFC from the locked region to the unlocked region, the LFC can be moved back down the positive-sloped lock track to the low point. The security component can control information to be displayed in an overlay display region in accordance with security level(s) of the device or application.

20 Claims, 15 Drawing Sheets

(51) Int. Cl.
　　*G06F 3/01*　　　　(2006.01)
　　*G06F 21/31*　　　(2013.01)
　　*H04M 1/725*　　　(2006.01)
　　*H04M 1/67*　　　　(2006.01)
　　*G06F 3/0488*　　 (2013.01)

(52) U.S. Cl.
　　CPC ......... *H04M 1/67* (2013.01); *G06F 2221/2105*
　　(2013.01); *G06F 2221/2113* (2013.01); *H04M*
　　*2250/22* (2013.01)
　　USPC .......................................... 715/863; 715/702

(56) References Cited

U.S. PATENT DOCUMENTS

| | | |
|---|---|---|
| 5,394,521 A | 2/1995 | Henderson, Jr. et al. |
| 5,838,326 A | 11/1998 | Card et al. |
| 5,847,709 A | 12/1998 | Card et al. |
| 6,269,369 B1 | 7/2001 | Robertson |
| 6,367,020 B1 | 4/2002 | Klein |
| 6,401,209 B1 | 6/2002 | Klein |
| 7,269,727 B1 | 9/2007 | Mukherjee et al. |
| 7,286,063 B2 | 10/2007 | Gauthey et al. |
| 7,308,926 B1 | 12/2007 | Hawkins |
| 7,322,626 B2 | 1/2008 | Thomas |
| 7,324,333 B2 | 1/2008 | Allen |
| 7,376,669 B2 | 5/2008 | Klein |
| 7,443,665 B2 | 10/2008 | Allen |
| 7,453,443 B2 | 11/2008 | Rytivaara et al. |
| 7,478,436 B1 | 1/2009 | Sheih et al. |
| 7,606,024 B2 | 10/2009 | Boss et al. |
| 7,620,982 B2 | 11/2009 | Ishidera |
| 7,628,335 B2 | 12/2009 | Morimoto et al. |
| 7,636,033 B2 | 12/2009 | Golden |
| 7,640,293 B2 | 12/2009 | Wilson et al. |
| 7,657,849 B2 | 2/2010 | Chaundri et al. |
| 7,761,814 B2 | 7/2010 | Rimas-Ribikauskas et al. |
| 7,933,609 B2 | 4/2011 | Lagerstedt et al. |
| 7,953,859 B1 | 5/2011 | Kiefhaber et al. |
| 8,316,095 B1 | 11/2012 | Wheeler et al. |
| 8,484,564 B1 | 7/2013 | Marti et al. |
| 8,543,927 B1 | 9/2013 | McKinley et al. |
| 8,676,901 B1 | 3/2014 | Nicolaou et al. |
| 2001/0044903 A1 | 11/2001 | Yamamoto et al. |
| 2002/0056046 A1 | 5/2002 | Klein |
| 2002/0077079 A1 | 6/2002 | Ishihara |
| 2002/0099960 A1 | 7/2002 | Klein |
| 2002/0114654 A1 | 8/2002 | Abe |
| 2003/0023688 A1 | 1/2003 | Denenberg et al. |
| 2003/0025840 A1 | 2/2003 | Arling |
| 2003/0074575 A1 | 4/2003 | Hoberock et al. |
| 2003/0074590 A1 | 4/2003 | Fogle et al. |
| 2003/0120957 A1* | 6/2003 | Pathiyal ........................ 713/202 |
| 2003/0172495 A1 | 9/2003 | Pan |
| 2003/0184592 A1 | 10/2003 | Awada et al. |
| 2003/0191960 A1 | 10/2003 | Hung-yi |
| 2003/0206224 A1 | 11/2003 | Sakakibara et al. |
| 2004/0034561 A1 | 2/2004 | Smith |
| 2004/0046018 A1 | 3/2004 | Dobbins |
| 2004/0082322 A1 | 4/2004 | Tani |
| 2004/0085351 A1 | 5/2004 | Tokkonen |
| 2004/0092247 A1 | 5/2004 | Tani |
| 2004/0113491 A1 | 6/2004 | Mauser |
| 2004/0113819 A1 | 6/2004 | Gauthey |
| 2004/0123135 A1 | 6/2004 | Goddard |
| 2004/0137884 A1 | 7/2004 | Engstrom et al. |
| 2004/0189439 A1 | 9/2004 | Cansino |
| 2004/0220913 A1 | 11/2004 | Walker |
| 2005/0085215 A1 | 4/2005 | Kokko et al. |
| 2005/0117564 A1 | 6/2005 | Vieri et al. |
| 2005/0234910 A1 | 10/2005 | Buchheit et al. |
| 2005/0253817 A1 | 11/2005 | Rytivaara et al. |
| 2005/0282135 A1 | 12/2005 | Berman |
| 2006/0012577 A1 | 1/2006 | Kyrola |
| 2006/0075250 A1 | 4/2006 | Liao |
| 2006/0123347 A1 | 6/2006 | Hewitt et al. |
| 2006/0176661 A1 | 8/2006 | Allen |
| 2006/0184351 A1 | 8/2006 | Corston-Oliver et al. |
| 2006/0195474 A1 | 8/2006 | Cadiz et al. |
| 2006/0253371 A1 | 11/2006 | Rutt et al. |
| 2006/0255907 A1 | 11/2006 | Min |
| 2006/0271526 A1 | 11/2006 | Charnock et al. |
| 2006/0282772 A1 | 12/2006 | Chamberlin et al. |
| 2006/0291157 A1 | 12/2006 | Allen |
| 2006/0291158 A1 | 12/2006 | Allen |
| 2007/0022163 A1 | 1/2007 | Wormald et al. |
| 2007/0085839 A1 | 4/2007 | Yang et al. |
| 2007/0088687 A1 | 4/2007 | Bromm et al. |
| 2007/0119952 A1 | 5/2007 | Morimoto et al. |
| 2007/0133771 A1 | 6/2007 | Stifelman et al. |
| 2007/0133802 A1 | 6/2007 | Yuan |
| 2007/0135091 A1 | 6/2007 | Wassingbo |
| 2007/0144225 A1 | 6/2007 | Tamura |
| 2007/0150842 A1* | 6/2007 | Chaudhri et al. ............. 715/863 |
| 2007/0161410 A1 | 7/2007 | Huang et al. |
| 2007/0203982 A1 | 8/2007 | Jagoe et al. |
| 2007/0204064 A1 | 8/2007 | Mail et al. |
| 2007/0220542 A1 | 9/2007 | Kim |
| 2007/0247276 A1 | 10/2007 | Murchison et al. |
| 2007/0274300 A1 | 11/2007 | Chu et al. |
| 2007/0282839 A1 | 12/2007 | Walker |
| 2008/0036743 A1 | 2/2008 | Westerman et al. |
| 2008/0036747 A1 | 2/2008 | Hope |
| 2008/0049135 A1 | 2/2008 | Okudaira |
| 2008/0055269 A1 | 3/2008 | Lemay et al. |
| 2008/0055276 A1 | 3/2008 | Chang |
| 2008/0059880 A1 | 3/2008 | Cato et al. |
| 2008/0064370 A1 | 3/2008 | Fukaya et al. |
| 2008/0089587 A1 | 4/2008 | Kim et al. |
| 2008/0122796 A1* | 5/2008 | Jobs et al. ..................... 345/173 |
| 2008/0153459 A1 | 6/2008 | Kansal et al. |
| 2008/0182563 A1 | 7/2008 | Wugofski et al. |
| 2008/0189122 A1 | 8/2008 | Coletrane et al. |
| 2008/0189623 A1 | 8/2008 | Patil |
| 2008/0207166 A1 | 8/2008 | Aerrabotu et al. |
| 2008/0222636 A1 | 9/2008 | Wang et al. |
| 2008/0229397 A1 | 9/2008 | Basner et al. |
| 2008/0256170 A1 | 10/2008 | Hayashi et al. |
| 2008/0281610 A1 | 11/2008 | Yoshida et al. |
| 2009/0006991 A1 | 1/2009 | Lindberg et al. |
| 2009/0029674 A1 | 1/2009 | Brezina et al. |
| 2009/0034804 A1 | 2/2009 | Cho et al. |
| 2009/0040018 A1 | 2/2009 | Lee et al. |
| 2009/0044578 A1 | 2/2009 | Boss et al. |
| 2009/0061823 A1 | 3/2009 | Chu |
| 2009/0066489 A1 | 3/2009 | Golden |
| 2009/0102803 A1 | 4/2009 | Newman et al. |
| 2009/0104925 A1 | 4/2009 | Aula |
| 2009/0106415 A1 | 4/2009 | Brezina et al. |
| 2009/0119678 A1 | 5/2009 | Shih et al. |
| 2009/0128335 A1 | 5/2009 | Leung |
| 2009/0157732 A1 | 6/2009 | Hao et al. |
| 2009/0167717 A1 | 7/2009 | Wang et al. |
| 2009/0170553 A1 | 7/2009 | Wang et al. |
| 2009/0177981 A1 | 7/2009 | Christie et al. |
| 2009/0187676 A1 | 7/2009 | Griffin et al. |
| 2009/0209235 A1 | 8/2009 | Lawler et al. |
| 2009/0215479 A1 | 8/2009 | Karmarkar |
| 2009/0217211 A1 | 8/2009 | Hildreth et al. |
| 2009/0234935 A1 | 9/2009 | Watson et al. |
| 2009/0245484 A1 | 10/2009 | Bates |
| 2009/0248844 A1 | 10/2009 | Sommer et al. |
| 2009/0259968 A1 | 10/2009 | Hsieh et al. |
| 2009/0264117 A1 | 10/2009 | Hsieh et al. |
| 2009/0264157 A1 | 10/2009 | Hsieh et al. |
| 2009/0265666 A1 | 10/2009 | Hsieh et al. |
| 2009/0288032 A1* | 11/2009 | Chang et al. ................... 715/776 |
| 2009/0296913 A1 | 12/2009 | Thomas et al. |
| 2009/0327263 A1 | 12/2009 | Maghoul et al. |
| 2010/0009727 A1 | 1/2010 | Presutti |
| 2010/0071423 A1 | 3/2010 | Dehaan et al. |
| 2010/0079380 A1 | 4/2010 | Nurmi |
| 2010/0082684 A1 | 4/2010 | Churchill et al. |
| 2010/0094939 A1 | 4/2010 | Cheng et al. |

(56) References Cited

U.S. PATENT DOCUMENTS

| | | | |
|---|---|---|---|
| 2010/0105440 | A1 | 4/2010 | Kruzeniski et al. |
| 2010/0127998 | A1 | 5/2010 | Hyun |
| 2010/0145951 | A1 | 6/2010 | Van Coeverden De Groot et al. |
| 2010/0156594 | A1 | 6/2010 | Chaikin et al. |
| 2010/0159944 | A1 | 6/2010 | Pascal et al. |
| 2010/0159995 | A1* | 6/2010 | Stallings et al. ............... 455/566 |
| 2010/0162133 | A1 | 6/2010 | Pascal et al. |
| 2010/0164740 | A1 | 7/2010 | Lo et al. |
| 2010/0199359 | A1 | 8/2010 | Miki |
| 2010/0207723 | A1 | 8/2010 | Cao et al. |
| 2010/0214237 | A1 | 8/2010 | Echeverri et al. |
| 2010/0223097 | A1 | 9/2010 | Kramer et al. |
| 2010/0241971 | A1 | 9/2010 | Zuber |
| 2010/0251116 | A1 | 9/2010 | Rimas-Ribikauskas et al. |
| 2010/0257490 | A1 | 10/2010 | Lyon et al. |
| 2010/0309149 | A1 | 12/2010 | Blumenberg et al. |
| 2010/0317335 | A1 | 12/2010 | Borovsky et al. |
| 2010/0325155 | A1 | 12/2010 | Skinner et al. |
| 2011/0035673 | A1 | 2/2011 | Chou et al. |
| 2011/0035708 | A1 | 2/2011 | Damale |
| 2011/0062143 | A1* | 3/2011 | Satanek ........................ 219/489 |
| 2011/0081922 | A1 | 4/2011 | Chandra et al. |
| 2011/0169909 | A1 | 7/2011 | Gu |
| 2012/0030287 | A1 | 2/2012 | Leonard |
| 2012/0303712 | A1 | 11/2012 | Polis et al. |
| 2012/0319985 | A1 | 12/2012 | Moore et al. |

OTHER PUBLICATIONS

Spagnuolo-Tweetdeck, http://edgehopper.com/how-to-use-tweetdeck-the-ultimate-twitter-client/,Feb. 12, 2009, 11 pages.
OA dated Apr. 6, 2012 for U.S. Appl. No. 12/643,726, 43 pages.
OA dated Jun. 12, 2012 for U.S. Appl. No. 12/903,618, 41 pages.
"Brads Live: AddressBooker & exporting my Facebook Phonebook" http://brad.livejournalcom/2398409.html as archived on archive.org on Dec. 5, 2008.
OA dated Aug. 1, 2012 for U.S. Appl. No. 12/903,632, 47 pages.
Office Action dated Aug. 23, 2013 for U.S. Appl. No. 12/643,726, 61 pages.
Office Action dated Nov. 1, 2013 for U.S. Appl. No. 12/903,382, 30 pages.
Office Action dated Sep. 26, 2013 for U.S. Appl. No. 12/903,618, 36 pages.
Office Action dated Oct. 11, 2013 for U.S. Appl. No. 12/903,679, 22 pages.
OA dated Jan. 30, 2013 for U.S. Appl. No. 12/903,632, 28 pages.
OA dated Dec. 20, 2012 for U.S. Appl. No. 12/903,679, 40 pages.
OA dated Mar. 13, 2013 for U.S. Appl. No. 12/643,726, 55 pages.
Office Action dated Jan. 31, 2014 for U.S. Appl. No. 12/903,679, 17 Pages.
OA dated Jun. 13, 2013 for U.S. Appl. No. 12/903,382, 53 pages.
OA dated May 14, 2013 for U.S. Appl. No. 12/903,414, 62 pages.
"Global Framework—UE Flows and Screen Details". AT&T Armstrong Project. Version 1.10. Last accessed Jun. 16, 2010, 166 pages.
"Global Framework—VD Specification". AT&T Armstrong project. Version 1.11. Last accessed Jun. 16, 2010, 117 pages.
"Phone Top—UE Flows and Screen Details". AT&T Armstrong Project. Version 1.18. Last accessed Jun. 16, 2010, 104 pages.
"Phone Top—VD Specification". AT&T Armstrong Project. Version 1.12. Last accessed Jun. 16, 2010, 52 pages.
"Phone / Dialer—UE Flows and Screen Details". AT&T Armstrong Project. Version 1.8. Last accessed Jun. 16, 2010, 57 pages.
"Dialer—VD Specification". AT&T Armstrong Project. Version 1.7. Last accessed Jun. 16, 2010, 19 pages.
"Contacts—UE Flows and Screen Details". AT&T Armstrong Project. Version 2.6. Last accessed Jun. 16, 2010, 142 pages.
"Contact—VD Specification". AT&T Armstrong Project. Version 2.2. Last accessed Jun. 16, 2010. 48 pages.
"Third-Party Pickers—UE Flows and Screen Details". AT&T Armstrong Project. Version 1.1. Last accessed Jun. 16, 2010, 23 pages.

"3rd Party Pickers". AT&T C@lumbus Project. Version 1.1. Last accessed Jun. 16, 2010, 7 pages.
"Social—UE Flows and Screen Details". AT&T C@lumbus Project. Version 1.5. Last accessed Jun. 16, 2010, 107 pages.
"Social—VD Specification". AT&T C@lumbus Project. Version 1.5. Last accessed Jun. 16, 2010, 39 pages.
"Media App—UE Flows and Screen Details". AT&T Armstrong Project. Version 1.6. Last accessed Jun. 16, 2010, 118 pages.
"Media—VD Specification". AT&T Armstrong Project. Version 1.3. Last accessed Jun. 16, 2010, 29 pages.
"Mobile Share—Reduced Scope; UE Flows and Screen Details". AT&T Armstrong Project. Version 1.2 RS. Last accessed Jun. 16, 2010, 59 pages.
"Mobile Share (Reduced Scope)". AT&T Armstrong Project. Version 1.2RS. Last accessed Jun. 16, 2010, 15 pages.
"Camera App—UE Flows and Screen Details". AT&T Armstrong Project. Version 1.8. Last accessed Jun. 16, 2010, 77 pages.
"Camera—VD Specification". AT&T Project. Version 1.8. Last accessed Jun. 16, 2010, 22 pages.
"Alarm Clock—UE Flows and Screen Details". AT&T Armstrong Project. Version 1.4. Last accessed Jun. 16, 2010, 35 pages.
"Alarm Clock—VD Specification". AT&T Armstrong Project. Version 1.4. Last accessed Jun. 16, 2010, 18 pages.
"Settings—UE Flows and Screen Details". AT&T Armstrong Project. Version 1.18. Last accessed Jun. 16, 2010, 180 pages.
"Settings—VD Specification". AT&T Armstrong Project. Version 1.8. Last accessed Jun. 16, 2010, 40 pages.
"Conversations—UE Flows and Screen Details". AT&T Armstrong Project. Version 1.3. Last accessed Jun. 16, 2010, 148 pages.
"Conversations". AT&T Armstrong Project. Version 1.5. Last accessed Jun. 16, 2010, 54 pages.
"Firmware Over the Air Updates—UE Flows and Screen Details". AT&T Armstrong Project. Version 1.9. Last accessed Jun. 16, 2010, 39 pages.
Paul McDougall. Browser. AT&T Armstrong Project. Version 1.3. Last accessed Jun. 16, 2010, 6 pages.
Paul McDougall. Maps. AT&T Armstrong Project. Version 1.3. Last accessed Jun. 16, 2010, 8 pages.
"Reference Guide". AT&T Armstrong Project. Version 1.0, Last accessed Jun. 16, 2010, 4 pages.
D. Austin Henderson, Jr. Rooms: the use of multiple virtual workspaces to reduce space contention in a window-based graphical user interface. ACM Transactions on Graphics. http://portal.acm.org/citation.cfm?id=24056&coll=portal&dl=ACM&CFID=23778768& CFTOKEN=77139655.
http://www.siliconvalleywatcher.com/mt/archives/2010/04/panama_kill_voi.php.
http://www.google.com/support/forum/p/voice/thread?tid=64d1c9d5fb45cccf&hl=en.
Bob Tedeschi, Group Texting Grows Up, With Features That Appeal to Adults. http://www.nytimes.com/2010/10/21/technology/personaltech/21smart.html. Last accessed Nov. 1, 2010, 3 pages.
A Teenager's Dream: An iPhone App for Free Texting—Bits Blog—NYTimes.com. http://bits.blogs.nytimes.com/2009/08/25/a-teens-dream-an-iphone-app-for-tree-texting. Last accessed Oct. 13, 2009, 19 pages.
Build and grow with Facebook Connect. http://developers.facebook.com/connect.php? tab=website. Last accessed Nov. 2, 2009, 2 pages.
Build and grow with Facebook Connect. http://developers.facebook.com/connect.php?tab=iphone. Last acceseed Nov. 2, 2009, 1 pages.
http://www.sprint.com/cdma/assets/pdfs/phone_guides/palm/palm_pre_p100_ug.pdf at pp. 44, 57-58. Last accessed Nov. 6, 2009, 3 pages.
MTN—Meeting the needs of the South African market for a new mobile messaging solution—Mobile IM. http://www.moviuscorp.com/files/case_study_mtn.pdf. Last accessed Nov. 2, 2009, 5 pages.
http://www.bizzia.com/buzznetworker/social-web-aggregation. Last accessed Nov. 6, 2009, 4 pages.
Alexander The Late. http://alexanderthelate.wordpress.com/2008/02/11/social-media-aggregation-lifestreaming-all-of-your-web-activity-in-one-simple-and-potentially-inconvenient-place/. Last accessed Nov. 3, 2009, 3 pages.

(56) References Cited

OTHER PUBLICATIONS

Schroeder, 20 Ways To Aggregate Your Social Networking Profiles, http://mashable.com/2007/07/17/social-network-aggregators/, Jul. 17, 2007, 20 pages.

Hirsch, iPhone 2.0 Apps: The Social Networking App Comparison, http://mashable.com/2008/07/17/iphone-social-networking-app-comparison/, Jul. 17, 2008, 9 pages.

Lifestream: Bebo's new social media aggregation tool | Media | guardian.co.uk, http://www.guardian.co.uk/media/pda/2009/feb/23/socialnetworking-bebo, Last Accessed Nov. 6, 2009, 3 pages.

Wikipedia, Social network aggregation—Widipedia, the free encyclopedia, http://en.wikipedia.org/wiki/Social_Network_Aggregation, Last Accessed Nov. 6, 2009, 3 pages.

Jaiku | Your Conversation, www.jaiku.com, Last accessed Nov. 6, 2009, 3 pages.

StumbleUpon.com: Personalized Recommendations to Help You Discover the Best of the . . . , www.stumbleupon.com, Last accessed Nov. 6, 2009, 2 pages.

The Walt Disney Internet Group, www.dig.com, Last accessed Nov. 6, 2009, 1 page.

Delicioussocial bookmarking, www.del.icio.us, Last accessed Nov. 6, 2009, 6 pages.

Google Wave—Wikipedia, the free encyclopedia, http://en.wikipedia.org/wiki/Google_wave, Last accessed Dec. 18, 2009, 5 pages.

Motorola Backflip (TM )—Wireless from AT&T, http://www.wireless.att.com/cell-phone-service/cell-phone-sales/promotion/motobackflip.jsp, Last Accessed Mar. 29, 2010, 2 pages.

Motoblur—Motorola USA, http://www.motorola.com/Consumers/US-EN/Consumer-Product-and-Services/MOTOBL . . . , Last accessed Mar. 29, 2010, 3 pages.

Notice of Allowance dated Jun. 27, 2014 for U.S. Appl. No. 12/903,679, 29 Pages.

Non-Final Office Action dated Jun. 18, 2014 for U.S. Appl. No. 12/643,726, 55 pages.

Non-Final Office Action dated Aug. 26, 2014 for U.S. Appl. No. 12/903,618, 25 pages.

Non-Final Office Action dated Sep. 23, 2014 for U.S. Appl. No. 12/903,382, 32 pages.

Final Office Action dated Sep. 30, 2014 for U.S. Appl. No. 12/643,726, 63 pages.

\* cited by examiner

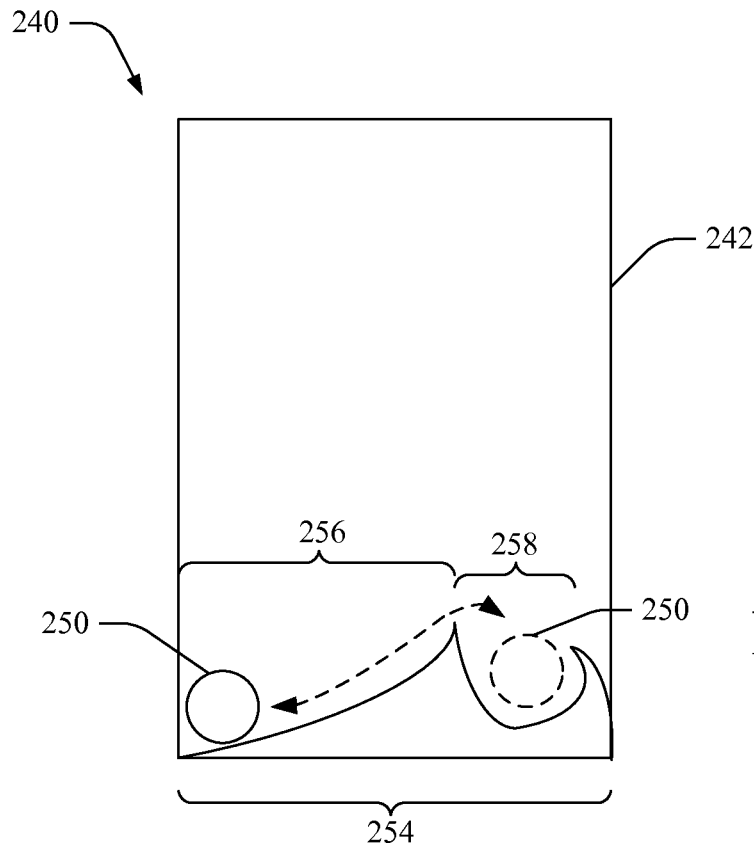
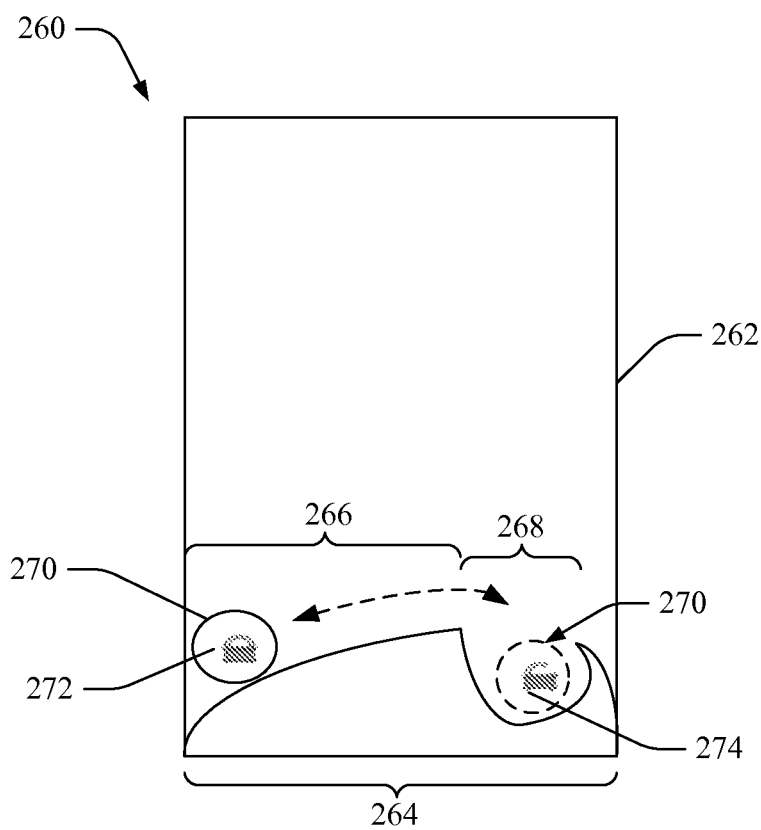

LOCKING AND UNLOCKING OF AN ELECTRONIC DEVICE USING A SLOPED LOCK TRACK

CROSS-REFERENCES TO RELATED APPLICATIONS AND CLAIM FOR PRIORITY

This application is a continuation-in-part of, and claims the benefit of, U.S. patent application Ser. No. 12/643,726, filed Dec. 21, 2009, and titled "SYSTEMS, APPARATUS, METHODS AND COMPUTER-READABLE STORAGE MEDIA FOR FACILITATING INTEGRATED MESSAGING, CONTACTS AND SOCIAL MEDIA FOR A SELECTED ENTITY", and further claims the benefit of U.S. Provisional Application No. 61/251,717, filed Oct. 14, 2009, and titled "SYSTEMS, METHODS AND APPARATUS FOR NEXT-GENERATION MOBILE MESSAGING", all of which are hereby incorporated herein by reference in their entirety.

BACKGROUND

Communication devices, such as mobile phones and computers, are ubiquitous in today's society. Communication devices are typically used to communicate information between communication device users and use a variety of different applications (e.g., word processing application, email application, social network application, electronic calendar application, alarm clock application, etc.). Certain of these communication devices (e.g., mobile phones, laptop computers) can be powered by battery, which can have limited power supply per charge. To facilitate conserving power, a communication device typically employ a sleep mode wherein the communication device enters a low power consumption mode, typically including partially or completely dimming the display of the device, when no interaction with the communication device is detected for a predetermined period of time.

Also, certain communication devices can have user interfaces (e.g., keyboard, number pad, touch screen, etc.) that can accidentally and undesirably receive input (e.g., keystroke, selection of an application, dialing of a phone number, etc.), for example, when an object (e.g., object in a purse or pocket) or a user's finger accidentally comes into contact with the user interface. To minimize this undesirable interaction with the user interface, many communication devices can be locked so that the user interface is only able to receive certain minimal input, such as input to illuminate the display to the locked screen and/or input to unlock the communication device. One conventional locking/unlocking technique is to have a user slide a lock icon in a horizontal direction from one side of the display to the other side of the display to unlock the communication device. Once unlocked, desired applications can be accessed on the communication device by the user. However, conventional communication-device locking systems still can be accidentally unlocked by accidentally received input (e.g., input that slides (e.g., moves, pushes) the lock icon from the locked to the unlocked position), and/or other undesired input can be accidentally received. It is therefore desirable to provide a security system to minimize the risk of accidentally unlocking the communication device and receiving undesired input via the user interface of the communication device.

SUMMARY

The following presents a simplified summary of the subject specification in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Systems, methods, and devices that secure an electronic device, such as a communication device (e.g., mobile phone), to minimize undesired access and input are presented. In an aspect, the communication device can comprise a security component that can secure the communication device in a desired state (e.g., locked state) to reduce or minimize the risk of undesired (e.g., accidental) unlocking of the communication device. In an aspect, the security component can generate and facilitate display of a lock track that can comprise a locked portion or region, which can be desirably shaped to have a desired amount of slope (e.g., positive slope, nonzero slope) wherein the locked portion can extend from a lower (e.g., lowest) point across a desired portion of the display screen to a higher (e.g., highest) point of the sloped lock track, and an unlocked portion, which can be adjacent to the higher point of the locked portion and can be or can include a chasm or recess, which can be positioned lower on the display screen than the higher point of the locked portion. The security component also can generate and facilitate displaying a lock facilitator component, which, for example, can be an interactive ball or circle, that can be moved along the lock track between (e.g., from, to) the locked position and unlocked position.

In one aspect, if the communication device is in the locked state, the lock facilitator component can be positioned at the lower point of the slope of the locked portion of the lock track. If the communication device has been inactive for at least a predefined sleep threshold period of time, the communication device can be in a sleep mode or power saver mode, wherein, for example, the display screen can be dimmed partially or completely to facilitate conserving power and other resources. If it is desired to unlock the communication device, input information (e.g., swipe gesture, tapping on the user interface (UI), keystroke, such as a keystroke held for an extended period of time) can be received via the UI (e.g., touch screen, keyboard, keypad, etc.) and the lock facilitator component can be moved from the locked position towards the unlocked position, the chasm, at or near the other side of the display screen, in response to the received input information. For example, when the UI comprises a touch screen, the user can touch the lock facilitator component (e.g., touch the position on the touch screen wherein the lock facilitator component is displayed) on the touch screen in the UI and can move or drag the lock facilitator component along the lock track and up its slope towards the higher point at the end of the locked portion of the lock track; or, when the UI does not include a touch screen, the user can press a specified key (e.g., unlock key) in the UI and hold the key down, wherein the lock facilitator component can be moved along the lock track and up its slope towards the higher point while the specified key is being held down.

If the input information is received such that the lock facilitator component is moved beyond the higher point of the locked portion and thus, in or over the unlocked portion (e.g., the chasm), the lock facilitator component can be placed or dropped in the unlocked portion of the lock track and held there to unlock the communication device or at least unlock the UI. At this point, the communication device can return to its last operational state, enter a new operational state (e.g., to answer an incoming phone call), enter a home screen, or enter a high security display screen associated with a high security locked state, wherein, when the device enters the high security display screen, for desired (e.g., all or a desired portion of) applications or access to the communication device (or UI), access to the communication device can be granted in response to receiving valid authentication credentials from the user. The communication device can prompt the user to enter different authentication credentials when the previously presented authentication credentials are not validated; however, after a predefined maximum threshold number of unsuccessful access attempts is reached, the security component can lock out further attempts to access the communication device (or UI) for a predefined period of time or until a reset is performed.

In another aspect, if the input information (e.g., gesture, keystroke) is discontinued before the lock facilitator component is moved beyond the higher point of the locked portion to a position over the unlocked portion, and the lock facilitator is therefore still located on the locked portion of the lock track, the communication device can remain in the locked state, and the lock facilitator component can move or roll back down the sloped lock track to the lower point of the locked track and can stop or rest at the lower point.

As a result, undesired and/or accidental gestures or keyboard keystrokes will not, or at least are less likely to, be able to move the lock facilitator component from the low point of the locked position up the sloped track and beyond the high point over the chasm of the unlocked position. Further, the lock facilitator component can return (e.g., automatically roll back) to the lower point when the lock facilitator component is not moved beyond the locked portion of the lock track. As a result, the features of the subject specification can reduce or minimize risk of undesired unlocking of the communication device.

In another aspect, the locked portion of the lock track can be shaped, as desired, to facilitate providing a desired amount of impedance to changing the state of the communication device from the locked state to the unlocked state, based at least in part on the shape of the locked portion of the lock track. For instance, a locked portion having a steeper slope can provide a higher change-of-state impedance, for changing from the locked state to the unlocked state, than a relatively less steep slope.

In still another aspect, the security component can provide different levels of security with regard to access to (e.g., unlocking of) the communication device based at least in part on communication device security parameters, application security parameters, and/or predefined security criteria. For example, when the communication device security parameters are set to low security level and the application security parameters for a particular application are set to low security level, if the user desires to access the particular application, the security component can grant and allow access to the particular application if the communication device (and associated security component) receives desired input information (e.g., gesture, keystroke) from the user to move the lock facilitator component along the lock track to the unlocked position (e.g., chasm) in the UI to unlock the communication device.

As another example, if the communication device security parameters are set to high security level or the application security parameters for a particular application are set to high security level, if the user desires to access the particular application, the moving of the lock facilitator component to the unlocked position can result in the UI displaying the high security display screen, instead of unlocking the communication device and allowing the user to access the particular application or putting the communication device in its last operational state prior to being locked. The security component via the high security display screen can request or prompt the user to enter valid authentication credentials in order to access the particular application. The authentication credentials can be received from the user via the UI, and the security component can compare the received authentication credentials to stored authentication credentials (e.g., authentication credentials relating to high security level for the communication device and/or relating to high security level for the particular application).

If the received authentication credentials match the stored authentication credentials, the security component can grant and allow access to the particular application and/or communication device to the user. If the received authentication credentials do not match the stored authentication credentials, the communication device can prompt the user to enter different authentication credentials; however, after a predefined maximum threshold number of unsuccessful access attempts is reached, the security component can lock out further attempts to access the communication device (or UI) for a predefined period of time or until a reset is performed. In an aspect, as desired, the authentication credentials can be in the form of a password, passcode, voice or audio sample (e.g., user's voice), visual sample, biometric information (e.g., information relating to physical features of the user to facilitate authentication involving fingerprint or hand recognition, eye or iris recognition, facial recognition, etc.), wherein the authentication credentials can be received directly from the user or can be embedded on a authentication credential device (e.g., card having the authentication credentials stored thereon, wherein the card can be scanned by the communication device).

In an aspect, the security component can grant access to certain emergency functions or applications on a limited basis, even when the communication device (and/or UI) is set to a high security level for which authentication credentials are to be presented in order to be granted access to the communication device, in accordance with the predefined criteria. For example, the security component can grant a user access to the communication device to make a 911 call or a call (or message) to a specified emergency contact number (or receive a call (or message) from a specified emergency contact number), or can grant access to and display "In Case of Emergency" (ICE) information (e.g., emergency contact information, desired medical information, etc.), which can be stored in the communication device.

In yet another aspect, the communication device can comprise an overlay component that can overlay and display information relating to a notification (e.g., notification of an incoming phone call, notification of an incoming text message (e.g., short message service (SMS) message, multimedia messaging service (MMS) message, instant message (IM), text over internet protocol (ToIP) message, etc.), notification of a scheduled calendar event, notification of activity relating to a social networking site, etc.) on the display screen of the UI, for example, when the communication device is in the locked state, or when the communication device is using an application. In accordance with an embodiment, when the communication device is in the locked state, the lock facilitator component can display a graphic of a lock in the locked state. When a notification is received, the graphic displayed on the lock facilitator component can be modified based at least in part on the notification being received. For example, if the notification relates to an incoming phone call, the graphic (e.g., icon) displayed on the lock facilitator component can be modified from a lock to a phone, or if the notification relates to an incoming message (e.g., text message), the graphic can be modified from a lock to a message icon, etc., to facilitate identifying the type of notification being received.

In yet another aspect, the amount and/or type of information displayed in the overlay display region of the display screen in relation to an incoming notification can be controlled based at least in part on the level of security associated with the notification, application relating to the notification, and/or the communication device. For example, if the level of security associated with the notification and the level of security associated with the communication device are both at a low level, the amount and/or type of information displayed in the overlay display region in relation to the notification can comprise more information, more types of information, and/or more detailed information, than the amount and/or type of information displayed in the overlay display region in relation to the notification when one or more of the level of security associated with the notification or the level of security associated with the communication device is/are at a higher (e.g., high) level of security.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

Non-limiting and non-exhaustive embodiments of various aspects detailed herein are described with reference to the following figures, wherein like reference names and/or numerals refer to like parts.

FIGS. 2A, 2B, 2C, and 2D illustrate respective diagrams of exemplary communication devices comprising respective types of UI screens for facilitating security of the respective communication devices in accordance with various embodiments described herein.

DETAILED DESCRIPTION

Figure 1:
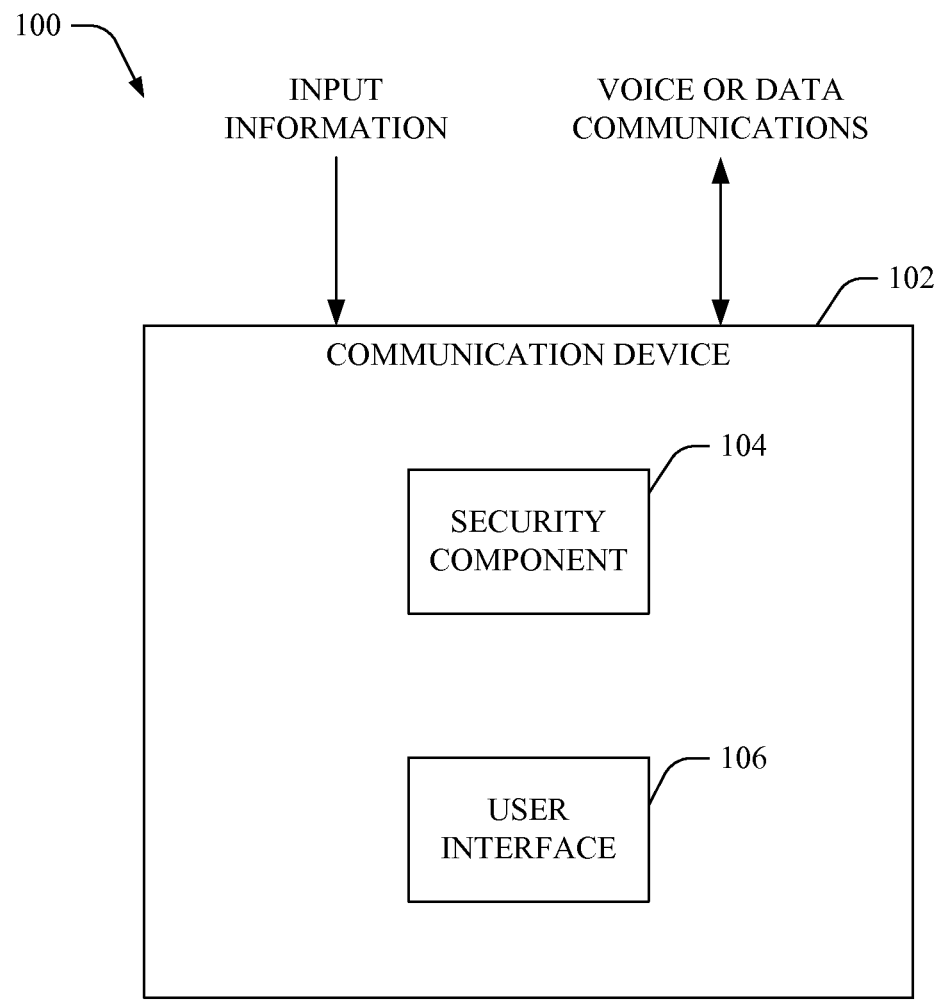
FIG. 1 illustrates a block diagram of an exemplary system that can secure an electronic device (e.g., a communication device), to minimize undesired access and input in accordance with various aspects and embodiments.

Certain illustrative embodiments are described herein in the following description and the annexed drawings. These embodiments are merely exemplary, non-limiting and non-exhaustive. As such, all modifications, alterations, and variations within the spirit of the embodiments is envisaged and intended to be covered herein.

Further, in the following description, for purposes of mere explanation, numerous, specific details are set forth in order to facilitate a more thorough understanding of the embodiments described herein, including the claimed subject matter. However, as is known to those of ordinary skill in the art, the embodiments can be practiced, in many instances, without inclusion of the specific details.

Electronic devices, such as mobile communication devices, can typically employ a battery to supply power to facilitate operation of the device. It is desirable to conserve power where possible because the amount of charge in a battery is limited. When portable electronic devices are held, placed in purses or pockets, etc., inadvertent or other undesired input (e.g., keystrokes, swipe gestures, etc.) can be received by the device, which can result in undesired operation of the device and/or undesired power consumption. Typically, a user interface (UI) of an electronic device can be dimmed when not being used, and a device lock can be employed to lock the device and/or user interface (UI). However, conventional device locks typically employ a horizontal bar in which a swipe gesture can move an icon across the horizontal bar to unlock the device or associated UI. Such conventional device locks still have the drawback that inadvertent or other undesired input (e.g., swipe gestures) can result in the icon moving across the horizontal bar and undesirably unlocking the device and illuminating the UI, which can consume power unnecessarily and/or result in undesired device operations being performed.

Also, electronic devices often can have stored therein or can receive information, including sensitive information, which a device user can desire to secure so that such information cannot be accessed by undesired persons. One drawback is, that, when notifications are received by a conventional electronic device, such electronic device does not distinguish between high-security information and low-security information in determining what information to display in the UI to the user as part of the notification, which can result in other persons being able to see potentially sensitive information displayed on the UI of the device.

To that end, systems, apparatuses, and methods that can facilitate securing an electronic device (e.g., mobile communication device) and information therewith are presented. A security component can facilitate generation, display, and operation of a lock track comprising a locked portion having a positive slope and an unlocked portion (e.g., chasm or recess) that is adjacent to a higher (e.g., highest) point of the positive-sloped unlocked portion of the lock track. A lock facilitator component can be moved along the lock track between a lower (e.g., lowest) point of the locked portion of the lock track and the unlocked portion of the lock track. In response to received input information (e.g., swipe gesture, tapping gesture, specified keystroke, etc.), the lock facilitator component can be moved, and if the input is not sufficient to move the lock facilitator component from the locked region beyond the higher point to at or over the unlocked region, the security component can facilitate moving (e.g., rolling) the lock facilitator component back down the positive-sloped lock track to the lower point of the locked portion. The security component also can facilitate displaying a high security display screen when the electronic device or an application is associated with a higher (e.g., high) security level. The security component also can facilitate generating and displaying an overlay display region in the UI display screen, and, in relation to a received or generated notification, can control the amount and/or type of information (e.g., notification-related information) to be displayed in the overlay display region in accordance with the security level(s) of the electronic device, an application, and/or the notification.

It will be appreciated by one of skill in the art that a communication network for systems described herein can include any suitable mobile-based and/or wireline-based circuit-switched communication network including a global systems for mobile communication (GSM) network, a time division multiple access (TDMA) network, a code division multiple access (CDMA) network, such as IS-95 and subsequent iterations of CDMA technology, an integrated digital enhanced network (iDEN) network and a public switched telephone network (PSTN). Further examples of a communication network can include any suitable data packet-switched or combination data packet/circuit-switched communication network, wired or wireless internet protocol (IP) network such as a voice over internet protocol (VoIP) network, an IP data network, a universal mobile telecommunication system (UMTS) network, a general packet radio service (GPRS) network, or other communication networks that provide streaming data communication over IP and/or integrated voice and data communication over combination data packet/circuit-switched technologies.

Similarly, one of ordinary skill in the art will appreciate that a communication device for systems disclosed herein can include a mobile device, mobile phone, a PSTN phone, a cellular communication device, a cellular phone, a satellite communication device, a satellite phone, a VoIP phone, a wireless fidelity (WiFi) phone, a dual-mode cellular/WiFi phone, a combination cellular/VoIP/WiFi/Worldwide Interoperability for Microwave Access (WiMAX) phone or any suitable combination thereof. Specific examples of a mobile device can include, but is not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones UMTS VoIP phones, or like devices or combinations thereof. To provide support for a mobile device, a gateway routing component can include any suitable component that can perform centralized routing within a mobile, satellite, or similar network (but optionally need not include components that route strictly within a PSTN network), routing between communication networks, between networks of varying architecture (e.g., between PSTN, GSM, Universal Mobile Telecommunications System (UMTS), Enterprise VoIP, the Internet, or combinations thereof), and the like. Specific examples of a gateway routing component can include, but are not limited to, a gateway mobile switching center (GMSC), a gateway general packet radio service (GPRS) support node (GGSN), a session border control (SBC) device, or like devices. Additionally, a data storage component of such a system can include any suitable device, process and/or combination device and process that can store digital and/or switched information (e.g., server, database, data store, or the like).

Moreover, terms like "user equipment," "mobile station," "mobile," "subscriber station," "mobile device", "communication device," "access terminal," "terminal," "handset," and similar terminology, can refer to a wireless device (e.g., cellular phone, smart phone, computer, personal digital assistant (PDA), set-top box, Internet Protocol Television (IPTV), electronic gaming device, multi-media recorder/player, video recorder/player, audio recorder/player, printer, etc.) utilized by a subscriber or user of a wireless communication service to receive or convey data, control, voice, video, sound, gaming, or substantially any data-stream or signaling-stream or, in an embodiment, a wired (e.g., landline) communication device that has mobile messaging functionality (e.g., short message service (SMS) messaging functionality, multimedia messaging service (MMS) messaging functionality, instant messaging (IM) functionality, text over internet protocol (ToIP) messaging functionality, etc.) and is utilized by a subscriber to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," "femto access point," "femtocell," "pico access point," "picocell," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

The following abbreviations can be relevant to the subject specification.

2G Second Generation
3G Third Generation
3GPP Third Generation Partnership Project
4G Fourth Generation
AGPS Assisted GPS
AP Access Point
ADSL Asymmetric Digital Subscriber Line
AWS Advanced Wireless Services
BRAS Broadband Remote Access Server
BTA Basic Trading Area
CDMA Code Division Multiple Access
CN Core Network
CS Circuit-Switched
CSCF Call Session Control Function
CPE Customer Premise Equipment CPN Customer Premise Network
DHCP Dynamic Host Configuration Protocol
DSL Digital Subscriber Line
DSLAM Digital Subscriber Line Access Multiplexer
E911 Enhanced 911
FCC Federal Communications Commission
FL Forward Link
GGSN Gateway GPRS Service Node
GPRS General Packet Radio Service
GPS Global Positioning System
GW Gateway
HAP Home Access Point
HSS Home Subscriber Server
ISDN Integrated Services Digital Network
UE User Equipment
UTRAN Universal Terrestrial Radio Access Network
IMS IP Multimedia Subsystem
IP Internet Protocol
ISP Internet Service Provider
MSA Metropolitan Statistical Areas
MSISDN Mobile Subscriber ISDN Number
MTA Major Trading Areas
NAT Network Address Translation
NTP Network Time Protocol
O&M Operation and Maintenance
PC Personal Computer
PCS Personal Communications Service
PS Packet-Switched
PSTN Public Switched Telephone Network
RAN Radio Access Network
RBS Radio Base Station
RL Reverse Link
RNC Radio Network Controller
RSA Rural Service Area
SGSN Serving GPRS Support Node
SIP Session Initiation Protocol
USSD Unstructured Supplementary Service Data
VPN Virtual Private Network
WAP Wireless Application Protocol
WCDMA Wideband CDMA
XDSL Asynchronous-DSL or Synchronous-DSL FIG. 1 illustrates a block diagram of an exemplary system 100 that can secure an electronic device (e.g., a communication device), to minimize undesired access and input in accordance with various aspects and embodiments. In an aspect, the system 100 can comprise an electronic device, such as communication device 102 (e.g., UE). It is to be appreciated and understood that, while an electronic device is often described herein as being a communication device, the subject specification is not so limited, as the electronic device can be virtually any desired portable or fixed electronic device (e.g., electronic game device, electronic clock, music player, video player, etc.), whether or not the electronic device is able to communicate (e.g., transmit, receive) with other electronic devices. In accordance with various embodiment, an electronic device, which is not a communication device, can comprise all or desired portion of the features described herein with regard to communication devices (e.g., communication device 102).

In an aspect, the communication device 102 can transmit or receive voice and/or data communications to or from other communication devices in a communication network. The communication device 102 also can receive input information, for example, from a user to facilitate performing operations, using application, and/or communicating with other communication devices using the communication device 102.

In another aspect, the communication device 102 can comprise a security component 104 that can secure the communication device 102 in a desired state (e.g., locked state), when desired, to reduce or minimize the risk of undesired (e.g., accidental) unlocking of the communication device. In an aspect, the security component 104 can generate and facilitate display of a lock track (e.g., as depicted in FIG. 2A, 2B, 2C, or 2D) that can comprise a locked portion or region, which can be desirably shaped to have a desired amount of slope (e.g., positive slope, non-zero slope) wherein the locked portion can extend from a lower (e.g., lowest) point across a desired portion of the display screen to a higher (e.g., highest) point (e.g., higher in height than the lower point) of the sloped lock track, and can further comprise an unlocked portion, which can be adjacent to the higher point of the locked portion and can be or can include a chasm or recess, which can be positioned lower (e.g., lower in height) on the display screen relative to the higher point of the locked portion. The security component 104 also can generate and facilitate displaying a lock facilitator component, which, for example, can be an interactive ball or circle, that can be moved along the lock track between the locked position and unlocked position. The lock track and lock facilitator component can be displayed on a display screen, which can be part of user interface (UI) 106. If desired, the UI 106 can be dimmed (e.g., partially, completely) when there has been no interaction for a predefined period of time. The lock track and lock facilitator component can be illuminated or highlighted in response to user interaction with the communication device 102 (e.g., in response to received input, such as a tap on the UI 106 (e.g., touch screen UI)).

In some embodiments, the UI 106 can be a touch screen. In other embodiments, the UI 106 can include any desired interface configured to display information (e.g., graphical, textual, pictorial, and/or video information, etc.). In certain embodiments, the UI 106 can include a plurality (e.g., virtually any desired number) of display regions. For example, in some embodiments, the UI 106 can include a plurality of display regions including a leftmost display region, a rightmost display region, and a middle display region between the leftmost display region and the rightmost display region, and/or can include an overlay display region that can be superimposed over another display region.

In one aspect, if the communication device 102 is in the locked state, the security component 104 can position the lock facilitator component at the lower point of the slope of the locked portion of the lock track. If the communication device 102 has been inactive for at least a predefined sleep threshold period of time, the communication device 102 can be in a sleep mode or power saver mode, wherein, for example, the display screen of the UI 106 can be dimmed partially or completely to facilitate conserving power and other resources. If it is desired to unlock the communication device 102, input information (e.g., swipe gesture (e.g., swipe right gesture, or alternatively, a swipe left gesture), tapping on the display screen of the UI 106 in the area where it is desired for the lock facilitator component to be moved, a specified keystroke, such as a keystroke held for an extended period of time, etc.) can be received via the UI 106 (e.g., touch screen, keyboard, keypad, etc.) and the lock facilitator component can be moved from the locked position towards the unlocked position (e.g., the chasm) at or near the other side of the display screen, in response to the received input information. For example, when the UI 106 comprises a touch screen, the user can touch the lock facilitator component (e.g., touch the position on the touch screen wherein the lock facilitator component is displayed) on the touch screen in the UI 106 and can move or drag the lock facilitator component along the lock track and up its slope towards the higher point at the end of the locked portion of the lock track. As another example, when the UI 106 does not include a touch screen, the user can press a specified key (e.g., unlock key) in the UI 106 and hold the specified key down, wherein the security component 104 can facilitate moving the lock facilitator component along the lock track and up its slope towards the higher point while the specified key of the UI 106 is being held down.

If the input information is received via the UI 106 such that the lock facilitator component is moved beyond the higher point of the locked portion and thus, is in the unlocked portion, or is at least over the unlocked portion (e.g., the chasm), the security component 104 can facilitate placing or dropping the lock facilitator component in the unlocked portion (e.g., chasm) of the lock track and the lock facilitator component can be held there to unlock the communication device 102, or at least unlock the UI 106 and/or other desired components associated with the communication device 102. At this point, the communication device 102 can return to its last operational state (e.g., the operational state the communication device 102 was in prior to entering the locked mode), enter a new operational state (e.g., enter a new operational state in response to an incoming communication, such as, for instance, entering a voice call application to answer an incoming phone call), enter a home screen, or enter a high security display screen associated with a high security locked state, wherein, when the communication device 102 enters the high security display screen, for desired (e.g., all or a desired portion of) applications or access to the communication device 102, access to the communication device can be granted in response to receiving valid authentication credentials from the user, in accordance with predefined security criteria. When the communication device 102 or UI 106 is unlocked and is being used, for example, for a phone call, the UI 106 can remain unlocked, although the UI display screen can be dimmed or enter sleep mode to facilitate conserving power, and the UI display screen can be illuminated again, as desired, by touching the touch screen UI, a home button, or a key.

In another aspect, if the input information (e.g., gesture, keystroke) is discontinued before the lock facilitator component is moved beyond the higher point of the locked portion to a position over the unlocked portion (e.g., if the lock facilitator component is released before the lock facilitator component is moved or rolled into the unlocked portion), and the lock facilitator is therefore still located on the locked portion of the lock track, the security component 104 can maintain the communication device 102 in the locked state, and the security component 104 can facilitate moving or rolling the lock facilitator component back down the sloped lock track to the lower point of the locked track in the display screen of the UI 106, and the lock facilitator component can stop or rest at the lower point.

As a result, undesired and/or accidental gestures or keyboard keystrokes will not, or at least are less likely to, be able to move the lock facilitator component from the low point of the locked position up the sloped track and beyond the high point over the chasm of the unlocked position. Further, the lock facilitator component can return (e.g., roll back) to the low point when the lock facilitator component is not moved beyond the locked portion of the lock track and input information relating to moving the lock facilitator component towards the unlocked position is no longer being received. By having the lock facilitator component move back to the lower point of the lock track when an unlock attempt (e.g., accidental unlock attempt) is unsuccessful, the subject specification can reduce or minimize undesired unlocking of the communication device 102 due to cumulative instances of undesired input information relating to unlocking the communication device 102 being received by the UI 106. As a result, the features of the subject specification can reduce or minimize risk of undesired unlocking of the communication device 102.

In still another aspect, the locked portion of the lock track can be shaped in a desired shape to facilitate providing a desired amount of impedance to changing the state of the communication device 102 from the locked state to the unlocked state, based at least in part on the respective shapes of the locked portion and the unlocked portion of the lock track as displayed in the display screen of the UI 106. For instance, the security component 104 can generate a lock track having a locked portion that can have a steeper slope, which can thereby provide a higher change-of-state impedance for changing from the locked state to the unlocked state, or can generate a lock track having a locked portion that can have a relatively less steep slope, which can thereby provide a lower change-of-state impedance for changing from the locked state to the unlocked state.

In yet another aspect, the security component 104 can provide different levels of security with regard to access to (e.g., unlocking of) the communication device 104 based at least in part on communication device security parameters, application security parameters, and/or predefined security criteria. The security component 104 can enforce the different levels of security facilitate controlling access to the communication device 102. For instance, if a communication device security parameter(s) is set to low security level and an application security parameter(s) associated with a particular application is set to low security level, and if the user desires to access the particular application via the communication device 102, the security component 104 can grant and allow access to the particular application if the communication device 102 (and associated security component 104) receives desired input information (e.g., gesture, keystroke) from the user to move the lock facilitator component along the lock track to the unlocked position (e.g., chasm) in the UI 106 to unlock the communication device 102.

As another example, if a communication device security parameter(s) is set to high security level or an application security parameter(s) associated with a particular application is set to high security level, and if the user desires to access the particular application on the communication device 102, the moving of the lock facilitator component to the unlocked position can result in the UI 106 displaying the high security display screen, instead of completely unlocking the communication device 102 and granting the user access to the particular application or putting the communication device 102 in its last operational state (e.g., prior to being placed in the locked state). The security component 104 via the high security screen can request or prompt the user to enter valid authentication credentials via the UI 106 in order to access the particular application.

The authentication credentials can be received from the user via the UI 106, wherein the authentication credentials can be in the form of, for example, a password, passcode, voice or audio sample (e.g., user's voice), visual sample, and/or biometric information (e.g., information relating to physical features of the user to facilitate authentication involving fingerprint or hand recognition, eye or iris recognition, facial recognition, etc.), etc. In an aspect, the authentication credentials can be received via the UI 106 directly from the user or can be embedded on an authentication credential device (e.g., card having the authentication credentials stored thereon), and the authentication credential device can be scanned by the security component 104 via the UI 106. In an embodiment, if the authentication credentials are a passcode or password entered via a keyboard on the UI 106, the keys of the keyboard can remain unhighlighted when pressed to minimize risk of detection of the passcode or password by other persons who may be able to view the UI display screen while the user is entering the passcode or password.

The security component 104 can compare the received authentication credentials to stored authentication credentials (e.g., authentication credentials relating to high security level for the communication device 102 and/or relating to high security level for the particular application). If the received authentication credentials match the stored authentication credentials, the security component 104 can grant and allow access to the particular application and/or communication device 102 to the user.

If the received authentication credentials do not match the stored authentication credentials, the security component 104 can facilitate displaying an error message in the UI display screen, and the user can be prompted to enter authentication credentials again. If a predefined maximum threshold number of unsuccessful access attempts (e.g., entering authentication credentials M times with an unsuccessful match, wherein M can be a desired positive integer) are made by the user without presenting valid authentication credentials, the security component 104 can facilitate locking the communication device 102 from further access attempts for a predefined period of time or until a reset is performed, and/or can present a authentication error notification to the user via the UI 106, wherein the notification also can inform the user when a next access attempt can be performed by the user. When the communication device 102 or UI 106 is locked for the predefined period of time, the security component 104 can employ a timer to track the amount of time that has elapsed since the last failed access attempt, and can allow another access attempt after the predefined period of time has elapsed.

Figure 5:
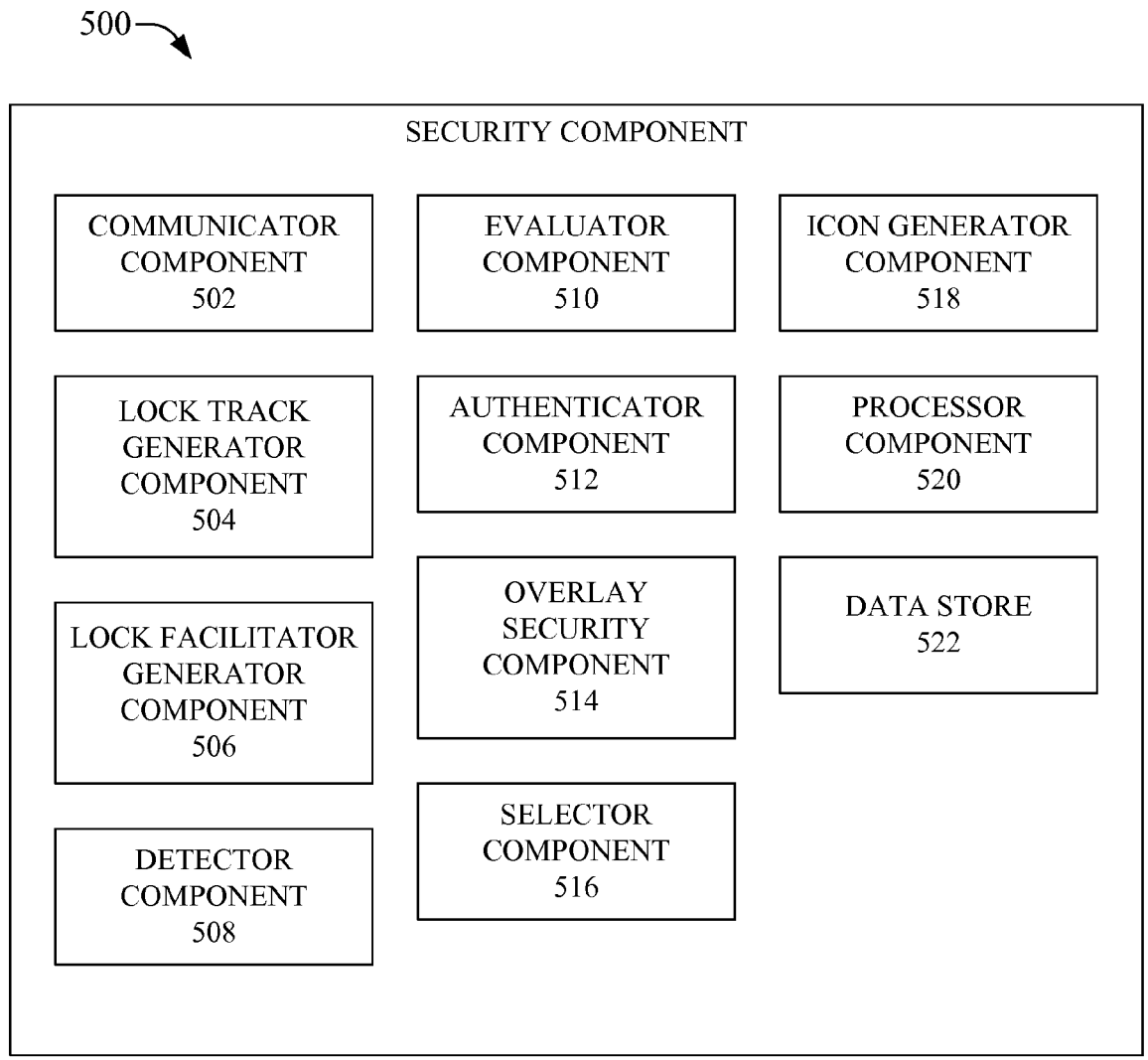
FIG. 5 illustrates a block diagram of an exemplary security component in accordance with an embodiment of the disclosed subject matter.

In accordance with various embodiments, even if the communication device 102 is set to a higher (e.g., highest) security level, wherein valid authentication credentials are to be presented in order to access the communication device 102 or UI 106, the security component 104 can still grant or allow a certain level of access to the communication device 102 or UI 106 under certain circumstances (e.g., emergency situations) in accordance with the predefined security criteria. For example, the user can interact with the UI 106 to make a 911 emergency call, and/or can use the communication device 102 to make or receive calls (and/or send or receive messages) to or from certain phone numbers (e.g., emergency contact numbers, such as a relative's phone number), as specified by the communication device user, wherein such certain phone numbers can be stored in a data store (e.g., as depicted in FIG. 5) associated with the security component 104. As another example, the communication device 102 can be used to store and display emergency information (e.g., emergency contact phone numbers, medical information, such as allergies, etc.) (also referred to herein as In Case of Emergency (ICE) information), and such emergency information can be accessed by a person without having to enter authentication credentials, even when the communication device 102 is set to a higher security level. With respect to other functions and applications, the communication device 102 can remain in a locked state.

In accordance with an aspect, the communication device 102 can receive one or more notifications, wherein a notification can relate to, for example, an application (e.g., local application or remote application) or other function associated with the communication device 102, an incoming call or message (e.g., SMS message, MMS message, IM, ToIP message, etc.), a missed call, activity relating to a web site (e.g., social networking site), a subscription service, an alarm, a low battery notification, etc. Information, or a desired portion thereof, relating to the notification can be displayed in an overlay display region or portion of the display screen of the UI 106, for example, when the communication device is in the locked state, or when the communication device is using an application.

In an embodiment, when the communication device 102 is in the locked state, the lock facilitator component can display a graphic of a lock in the locked state. When a notification is received, the security component 104 (or another desired component) can modify the graphic displayed on the lock facilitator component based at least in part on the notification being received. For example, if the notification relates to an incoming phone call, the graphic (e.g., icon) displayed on the lock facilitator component can be modified from a lock to a phone, or if the notification relates to an incoming message (e.g., text message), the graphic can be modified from a lock to a message icon, etc., to facilitate identifying the type of notification generated by or being received by the communication device 102.

In an aspect, the security component 104 can control the amount and/or type of information displayed in the overlay display region of the display screen of the UI 106 in relation to a generated or incoming notification based at least in part on the level of security associated with the notification and/or the level of security associated with the communication device 102. For instance, if the level of security associated with the notification and the level of security associated with the communication device are both at a low security level, the security component 104 can facilitate displaying a low-security-authorized subset of information relating to the notification in the overlay display region, wherein the amount and/or type of information included in the low-security-authorized subset of information can comprise more information, more types of information, and/or more detailed information, than the amount and/or type of information included in a high-security-authorized subset of information that can be displayed in the overlay display region in relation to the notification when one or more of the security level associated with the notification or the security level associated with the communication device 102 is/are at a higher (e.g., high) level of security. As a result, information (e.g., secure or personal information) that a communication device user does not want others to be able to see or access can be secured by the communication device 102 while still providing the communication device user with a notification and associated desired subset of information so that the user can be securely and desirably informed in relation to the notification.

In an embodiment, the communication device 102 can facilitate integrated messaging, contacts and social media for a selected entity(ies), such as more fully described in co-pending, related U.S. patent application Ser. No. 12/643,726, filed Dec. 21, 2009, and titled "SYSTEMS, APPARATUS, METHODS AND COMPUTER-READABLE STORAGE MEDIA FOR FACILITATING INTEGRATED MESSAGING, CONTACTS AND SOCIAL MEDIA FOR A SELECTED ENTITY", which is incorporated herein by reference in its entirety. The communication device 102 can comprise an application integration component (not shown) that can be configured to receive a signal in response to a detected input gesture indicative of a selection of an entity. The selection can be performed via at least one application in which the entity can be selected. The application integration component also can be configured to, in response to receiving the signal, integrate the application in which the entity can be selected with at least one application from which social media information can be provided, such that social media information about the entity can be generated. The social media information can include, for example, information from one or more social networking websites. In an aspect, the UI 106 can be configured to display the social media information generated about the entity. The communication device 102 also can include a computer-readable storage medium (e.g., data store; not shown in FIG. 1) that can store computer-executable instructions that, if and when executed, can cause a processor (not shown in FIG. 1) to perform one or more functions of the UI 106.

Figure 2A:
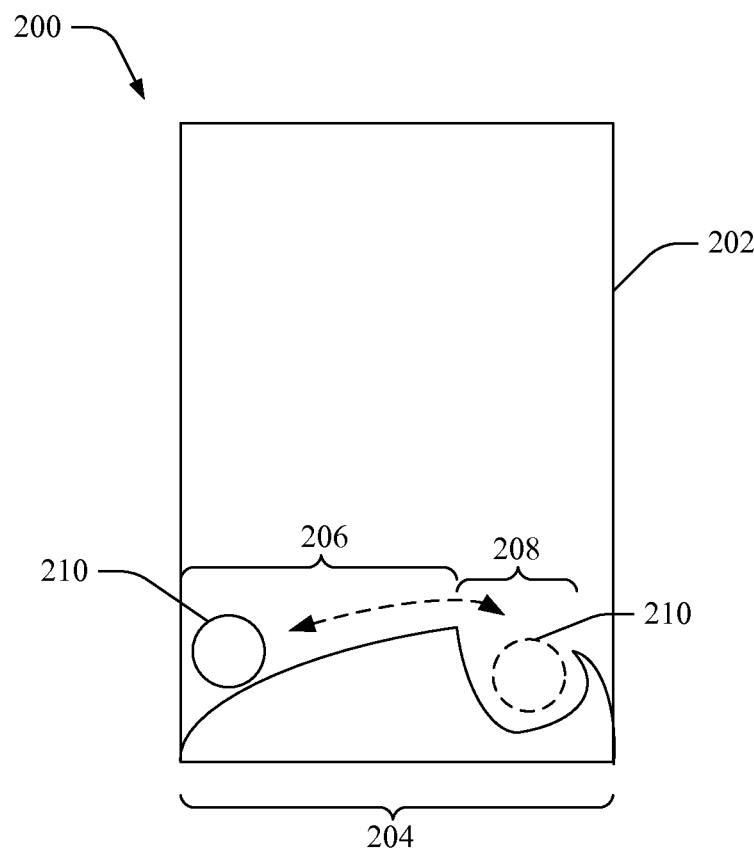

FIGS. 2A, 2B, 2C, and 2D illustrate respective diagrams of exemplary communication devices comprising respective types of UI screens for facilitating security of the respective communication devices in accordance with various embodiments described herein. FIG. 2A depicts a diagram of an exemplary communication device 200 comprising a UI screen for facilitating security of a communication device in accordance with an embodiment of the disclosed subject matter. The security component (e.g., 104) can control the state (e.g., locked, unlocked) of the communication device 200.

In an aspect, the communication device 200 can comprise the UI 202 that can include a lock track 204, which can comprise, at least, a locked region 206 and an unlocked region 208. The locked region 206 can correspond to a locking portion of the lock track 204 while the unlocked region 208 can correspond to an unlocking portion of the lock track 204. In accordance with an embodiment, the lock track 204 can be desirably shaped such that the locked region 206 can have a desired positive slope that can increase in height as the lock track proceeds from a lower point of the locked region 206 to a higher (e.g., highest) point of the locked region 206. The lock track 204 also can form the unlocked region 208 as a chasm adjacent to the higher point of the locked region 206, wherein the bottom of the chasm can be at a lower height than the higher point of the locked region 206 and can be shaped and sized such that it can receive and a lock facilitator component 210. In an aspect, the UI 202 also can display the lock facilitator component 210, which can be employed to transition the communication device 200 between a locked state (e.g., in locked region 206) and an unlocked state (e.g., in unlocked region 208). The shape of the locked region 206 can be desirably curved or rounded (e.g., a concave-type shape), wherein the curved or rounded shape, as well as the positive slope, of the locked region 206 can facilitate increasing the amount of impedance in relation to a change of state from locked to unlocked and/or increase the distance between the rest position (e.g., lower point) in the locked region 206 and the unlocked region 208, as compared to a conventional lock track that spans horizontally across the display screen of the UI 202, to facilitate reducing or minimizing undesired (e.g., accidental) unlocking of the communication device 200.

At a first time, the lock facilitator component 210 (e.g., lock icon) can reside at a lower (e.g., lowest) point in the locked region 206 of the UI 202, and, in such instance, the UI 202 and/or communication device 200 can be in a locked state. At a second time, in response to input information (e.g., unlock gesture; pressing of an unlock key) received by the UI 202, the lock facilitator component 210 can be moved along the lock track 204 towards the unlocked region 208. In various embodiments, the input information can be an input gesture such as a swipe right gesture from the locked region 206 to the unlocked region 208, a gesture wherein the touch screen is touched over the position where the lock facilitator component 210 is displayed and the lock facilitator component 210 can follow the gesture as it moves across the screen of the UI 202, a gesture tap or press on the UI 202 in the unlocked region 208 while the lock facilitator component 210 is in the locked region 206 of the UI 202, or a pressing of a specified key, which is associated with unlocking the communication device 200, on a keyboard of the UI 202. If the input information is not sufficient to move the lock facilitator component 210 from the lower point of the locked region 206 beyond the higher point of the locked region 206 to the unlocked region 208, the lock facilitator component 210 can move or roll back down the slope of the locked region 206 of the lock track back to the rest position, and the communication device 200 and/or UI 202 can remain in the locked state. While the embodiments shown and described disclose a swipe right gesture for unlocking the communication device 200, in other embodiments wherein the design of the locations of the locking and unlocking portions of the UI 202 is suitable, the communication device 200 and/or UI 202 can be unlocked upon receiving a swipe left gesture, a swipe up, or a swipe down gesture, for example.

Figure 2B:
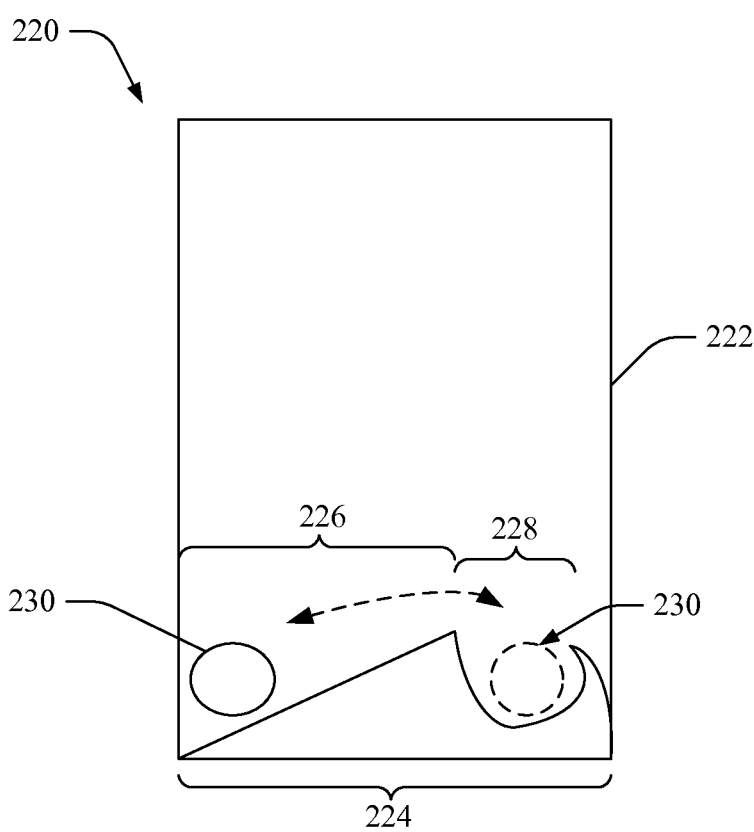

FIG. 2B illustrates a diagram of an exemplary communication device 220 comprising a UI screen for facilitating security of the communication device in accordance with another embodiment of the disclosed subject matter. The security component (e.g., 104) can control the state (e.g., locked, unlocked) of the communication device 200.

In an aspect, the communication device 220 can comprise the UI 222 that can include a lock track 224, which can comprise, at least, a locked region 226 and an unlocked region 228. The locked region 226 can correspond to a locking portion of the lock track 224 while the unlocked region 208 can correspond to an unlocking portion of the lock track 224. In accordance with an embodiment, the lock track 224 can be desirably shaped such that the locked region 226 can have a desired positive slope that can increase in height as the lock track proceeds from a lower point of the locked region 226 to a higher (e.g., highest) point of the locked region 226. The lock track 224 also can form the unlocked region 228 as a chasm adjacent to the higher point of the locked region 226, wherein the bottom of the chasm can be at a lower height than the higher point of the locked region 226 and can be shaped and sized such that it can receive and a lock facilitator component 230. In an aspect, the UI 222 also can display the lock facilitator component 230, which can be employed to transition the communication device 220 between a locked state (e.g., in locked region 226) and an unlocked state (e.g., in unlocked region 228). The shape of the locked region 226 can be desirably shaped in a straight line having a positive slope of a desired slope value or amount, wherein the positive slope of the locked region 226 can facilitate increasing the amount of impedance in relation to a change of state from locked to unlocked and/or increase the distance between the rest position (e.g., lower point) in the locked region 226 and the unlocked region 228, as compared to a conventional lock track that spans horizontally across the display screen of the UI 222, to facilitate reducing or minimizing undesired (e.g., accidental) unlocking of the communication device 220.

At a first time, the lock facilitator component 230 can reside at a lower (e.g., lowest) point in the locked region 226 of the UI 222, and, in such instance, the UI 222 and/or communication device 220 can be in a locked state. At a second time, in response to input information (e.g., unlock gesture, pressing of an unlock key) received by the UI 222, the lock facilitator component 230 can be moved along the lock track 224 towards the unlocked region 228. In various embodiments, the input information can be an input gesture such as a swipe right gesture from the locked region 226 to the unlocked region 228, a gesture wherein the touch screen is touched over the position where the lock facilitator component 230 is displayed and the lock facilitator component 230 can follow the gesture as it moves across the screen of the UI 222, a gesture tap or press on the UI 222 in the unlocked region 228 while the lock facilitator component 230 is in the locked region 226 of the UI 222, or a pressing of a specified key, which is associated with unlocking the communication device 220, on a keyboard of the UI 222. If the input information is not sufficient to move the lock facilitator component 230 from the lower point of the locked region 226 beyond the higher point of the locked region 226 to the unlocked region 228, the lock facilitator component 230 can move or roll back down the slope of the locked region 226 of the lock track back to the rest position, and the communication device 220 and/or UI 222 can remain in the locked state. While the embodiments shown and described disclose a swipe right gesture for unlocking the communication device 220, in other embodiments wherein the design of the locations of the locking and unlocking portions of the UI 222 is suitable, the communication device 220 and/or UI 222 can be unlocked upon receiving a swipe left gesture, a swipe up, or a swipe down gesture, for example.

FIG. 2C illustrates a diagram of an exemplary communication device 240 comprising a UI screen for facilitating security of the communication device in accordance with still another embodiment of the disclosed subject matter. The security component (e.g., 104) can control the state (e.g., locked, unlocked) of the communication device 240.

In an aspect, the communication device 240 can comprise the UI 242 that can include a lock track 254, which can comprise, at least, a locked region 256 and an unlocked region 258. The locked region 256 can correspond to a locking portion of the lock track 254 while the unlocked region 258 can correspond to an unlocking portion of the lock track 254. In accordance with an embodiment, the lock track 254 can be desirably shaped such that the locked region 256 can have a desired positive slope that can increase in height as the lock track proceeds from a lower point of the locked region 256 to a higher (e.g., highest) point of the locked region 256. The lock track 254 also can form the unlocked region 258 as a chasm adjacent to the higher point of the locked region 256, wherein the bottom of the chasm can be at a lower height than the higher point of the locked region 256 and can be shaped and sized such that it can receive and a lock facilitator component 250. In an aspect, the UI 242 also can display the lock facilitator component 250, which can be employed to transition the communication device 240 between a locked state (e.g., in locked region 256) and an unlocked state (e.g., in unlocked region 258). The shape of the locked region 256 can be desirably curved or rounded (e.g., a convex-type shape), wherein the curved or rounded shape, as well as the positive slope, of the locked region 256 can facilitate increasing the amount of impedance in relation to a change of state from locked to unlocked and/or increase the distance between the rest position (e.g., lower point) in the locked region 256 and the unlocked region 258, as compared to a conventional lock track that spans horizontally across the display screen of the UI 242, to facilitate reducing or minimizing undesired (e.g., accidental) unlocking of the communication device 240.

At a first time, the lock facilitator component 250 can reside at a lower (e.g., lowest) point in the locked region 246 of the UI 242 and, in such instance, the UI 242 and/or communication device 240 can be in a locked state. At a second time, in response to input information (e.g., unlock gesture, pressing of an unlock key) received by the UI 242, the lock facilitator component 250 can be moved along the lock track 244 towards the unlocked region 248. In various embodiments, the input information can be an input gesture such as a swipe right gesture from the locked region 246 to the unlocked region 248, a gesture wherein the touch screen is touched over the position where the lock facilitator component 250 is displayed and the lock facilitator component 250 can follow the gesture as it moves across the screen of the UI 242, a gesture tap or press on the UI 242 in the unlocked region 248 while the lock facilitator component 250 is in the locked region 246 of the UI 242, or a pressing of a specified key, which is associated with unlocking the communication device 240, on a keyboard of the UI 242. If the input information is not sufficient to move the lock facilitator component 250 from the lower point of the locked region 246 beyond the higher point of the locked region 246 to the unlocked region 248, the lock facilitator component 250 can move or roll back down the slope of the locked region 246 of the lock track back to the rest position, and the communication device 240 and/or UI 242 can remain in the locked state. While the embodiments shown and described disclose a swipe right gesture for unlocking the communication device 240, in other embodiments wherein the design of the locations of the locking and unlocking portions of the UI 242 is suitable, the communication device 240 and/or UI 242 can be unlocked upon receiving a swipe left gesture, a swipe up, or a swipe down gesture, for example.

FIG. 2D illustrates a diagram of an exemplary communication device 260 comprising a UI screen for facilitating security of a communication device in accordance with an embodiment of the disclosed subject matter. The security component (e.g., 104) can control the state (e.g., locked, unlocked) of the communication device 260.

In an aspect, the communication device 260 can comprise the UI 262 that can include a lock track 264, which can comprise, at least, a locked region 266 and an unlocked region 268. In an aspect, the UI 262 also can display the lock facilitator component 270, which can be employed to transition the communication device 260 between a locked state (e.g., in locked region 266) and an unlocked state (e.g., in unlocked region 268).

In another aspect, the lock facilitator component 270 can be displayed in the locked region 266 or the unlocked region 268. At a first time, the lock facilitator component 270 can reside in the locked region 266 and the UI 262 and/or communication device 260 can be in a locked state. While in the locked region 266, the lock facilitator component 270 also can display, in the UI 262, a lock icon 272 shown in the locked state. At a second time, the lock facilitator component 270 can be moved to the locked region 268 from the unlocked region 268. When the lock facilitator component 270 is moved to the unlocked region 268, a new icon 274 (e.g., unlocked lock icon) can be displayed by the lock facilitator component 270, wherein the lock facilitator component 270 can display an icon of an unlocked lock.

Figure 3:
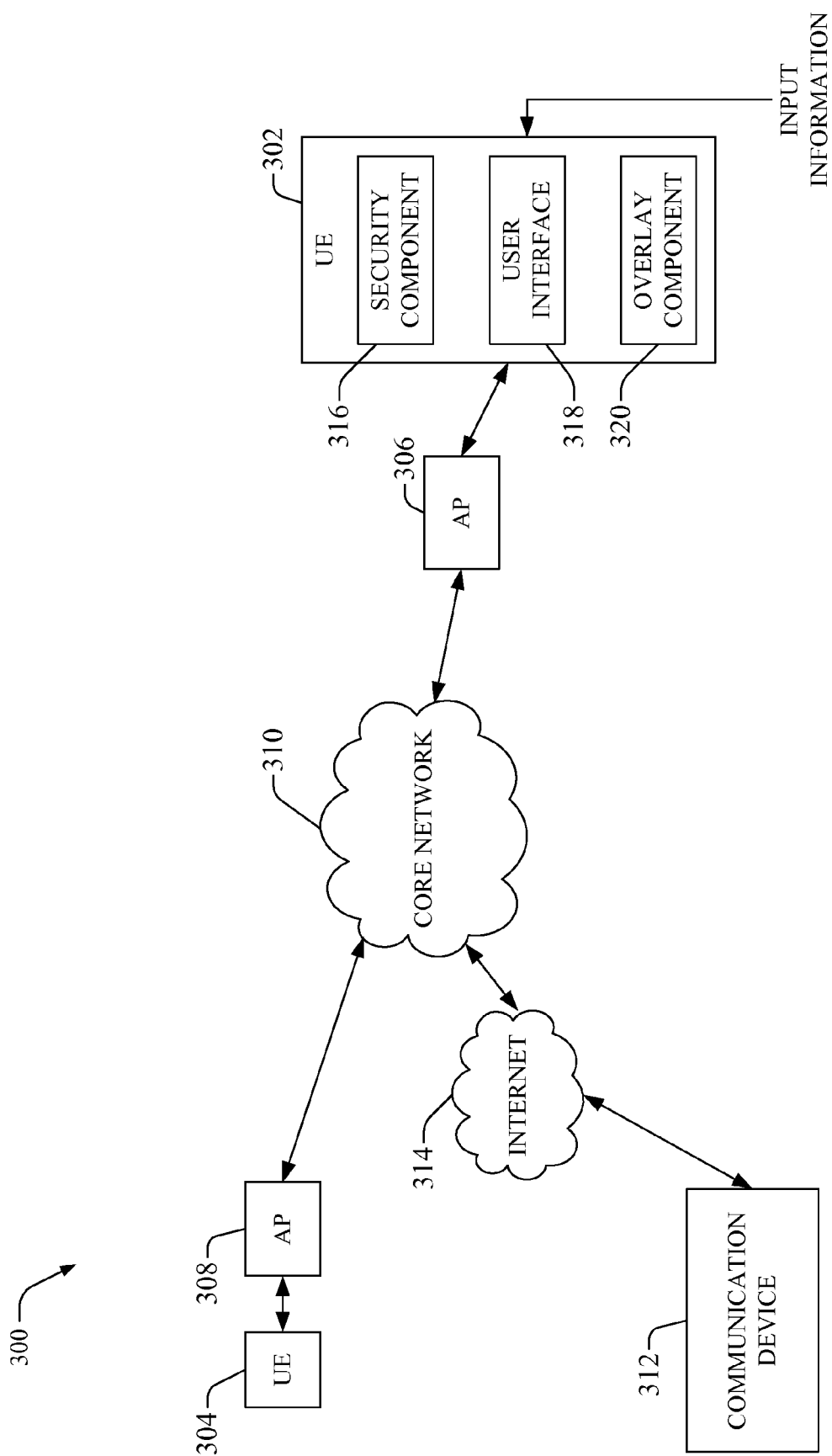
FIG. 3 illustrates a block diagram of an exemplary system that can facilitate security of a communication device in accordance with various aspects of the disclosed subject matter.

FIG. 3 illustrates a diagram of an exemplary system 300 that can facilitate security of a communication device in accordance with various aspects of the disclosed subject matter. In an aspect, the system 300 can include a desired number of UEs (e.g., mobile and/or wireless communication device, such as a mobile phone (e.g., 3GPP UMTS phone), personal digital assistant (PDA), computer, IPTV, landline phone comprising mobile messaging functionality, gaming console, set-top box (STB), multi-media recorder/player, video recorder/player, audio recorder/player, printer, etc.), such as UE 302 and UE 304 in the communication network environment. UE 302 and/or UE 306 can be located in a wireless portion (e.g., region) of the communication network, for example. UE 302 can be connected (e.g., wirelessly connected) to an AP 306 (e.g., macro AP, femto AP, pico AP, etc.) that can serve a specified coverage area to facilitate communication by the UE 302 and other UEs in the wireless communication network environment. UE 304 can be connected (e.g., wirelessly connected) to an AP 308 (e.g., macro AP, femto AP, pico AP, etc.) that can serve a specified coverage area (e.g., a different coverage area than AP 306) to facilitate communication by the UE 304 and other UEs in the wireless communication network environment. The APs 306 and 308 can serve respective coverage cells (e.g., macrocells, femtocells, picocells, etc.) that can cover respective specified areas, and the APs 306 and 308 can service mobile wireless devices, such as UE 302 and UE 304, located in the respective areas covered by the respective cells, where such coverage can be achieved via a wireless link (e.g., uplink (UL), downlink (DL)). When an attachment attempt is successful, the UE 302 can be served by the AP 306, and UE 304 can be served by AP 308, and incoming voice and data traffic can be paged and routed to the UE 302 through the AP 306, and to the UE 304 through the AP 308, respectively, and outgoing voice and data traffic from the UE 302 and/or UE 304 can be paged and routed through the AP 306 or AP 308, respectively, to other communication devices (e.g., another UE). In an aspect, UE 302 UE 304 can be connected and can communicate wirelessly using virtually any desired wireless technology, including, for example, cellular, Wi-Fi, Wi-Max, wireless local area networks (WLAN), etc. In another aspect, UE 302 and UE 304 each can comprise the same or similar functionality, and/or same or similar features, as communication devices, as more fully described herein, for example, with regard to system 100, and communication devices 200, 220, 240, and/or 260.

In another aspect, the AP 306 and AP 308 can be associated with (e.g., communicatively connected to) a core network 310 (e.g., 2G, 3G, 4G, or xG network, where x can be virtually any desired integer or real value) that can facilitate wireless communication by the UE 302, UE 304, and/or other communication devices associated with the core network 310 with other communication devices (e.g., wireless communication devices, wireline communication devices) in the communication network environment. The core network 310 can facilitate routing voice and data communications between a communication device(s) (e.g., UE 302, UE 304) and other communication devices (e.g., UE, landline phone, computer, email server, STB, multimedia server, audio server, video server, news server, financial or stock information server, other communication devices, etc.) associated with the core network 310 in the communication network environment. The core network 310 also can allocate resources to the UEs in the network, convert or enforce protocols, establish and enforce Quality of Service (QoS) for the UEs, provide applications or services in the network, translate signals, and/or perform other desired functions to facilitate system interoperability and communication in the wireless communication network. The core network 310 further can include desired components, such as routers, nodes, switches, interfaces, controllers, etc., that can facilitate communication of data between communication devices in the communication network environment.

In another aspect, the system 300 also can contain a communication device 312 that can be communicating with (e.g., via) the Internet 314 (or another communication network (e.g., IP-based network)) via a wired or wireless communication connection, wherein, for example, a wired communication connection can be a DSL-type or broadband connection facilitated via an Ethernet connection, and a wireless communication connection can be facilitated via a connection of the communication device 312 to an AP (not shown). The communication device 312 can transmit or receive information via the wired or wireless connection through the Internet 314 to or from other communication devices (e.g., UE 302).

In an embodiment, the UE 302 can comprise a security component 316 that can facilitate controlling the access state (e.g., locked state, unlocked state) of the UE 302 and/or UI 318 of the UE 302 to facilitate securing the UE 302 and information associated therewith (e.g., information transmitted from, received by, or stored in the UE 302). The security component 316 and UI 318 each can include the same or similar functionality, and/or same or similar features, as respective components, such as more fully described herein with regard to system 100, and communication devices 200, 220, 240, and/or 260.

In an aspect, the UE 302 can include an overlay component 320 that can facilitate generating an overlay display region of a desired size in the UI 318, wherein the overlay display region can be overlayed or superimposed on one or more other display regions in the UI 318. The overlay component 320 also can facilitate display of desired information in the overlay display region, wherein the desired information can relate to a generated (e.g., generated by the UE 302) and/or received notification, for example, relating to an application (e.g., local application and/or remote application) associated with the UE 302.

In another aspect, the security component 316 can control the amount and/or type of information displayed in the overlay display region in relation to a notification based at least in part on the security level associated with the UE 302 and/or security level associated with the application associated with the notification, as more fully disclosed herein. For example, if the communication device 312 (e.g., associated with a social networking site or entity) transmits a notification relating to an application (e.g., application relating to the social networking site or entity) and comprising a subset of information to the UE 302, and the application is identified as being associated with a high security level (e.g., as specified by the application or the security component 316) and/or the UE 302 is associated with a high security level (e.g., the security level relating to functions, applications, or operations of the UE 302 is set to a high security level), the security component 316 can identify the security level as high and can filter the subset of information received in the notification from the communication device 312 to facilitate filtering out portions (e.g., amount and/or type of information) of the received information for which display in the overlay display region is not desired for security reasons, and the security component 316 can facilitate display of a high-security-authorized subset of information relating to the notification in the overlay display region of the UI 318, in accordance with the predefined security criteria.

As another example, if the communication device 312 transmits a notification relating to an application and comprising a subset of information to the UE 302, and the application is identified as being associated with a low security level (e.g., as specified by the application or the security component 316) and the UE 302 is associated with a low security level (e.g., the security level relating to functions, applications, or operations of the UE 302 is set to a low security level), the security component 316 can identify the security level as low and can facilitate display of the received subset of notification information in the overlay display region of the UI 318 or can desirably filter the received subset of information to facilitate filtering out portions (e.g., amount and/or type of information) of the received information for which display in the overlay display region is not desired (e.g., for reasons of available space in the overlay display region), and the security component 316 can facilitate display of a low-security-authorized subset of information relating to the notification in the overlay display region of the UI 318, in accordance with the predefined security criteria. For instance, the amount and/or types of information displayed in the overlay display region when the security component 316 identifies the security level as low can be more information, more types of information, and/or more detailed information than the amount and/or types of information displayed in the overlay display regions when the security component 316 identifies the security level as high, to facilitate securing sensitive or personal information, which can have a high security level, when desired.

It is to be appreciated and understood that UE 304 and/or communication device 312 can include the same or similar functionality, and/or same or similar features, and/or same or similar components, as UE 302, but certain components (e.g., security component 316, UI 318, overlay component 320) are not shown with respect to UE 304 and communication device 312 for reasons of brevity and clarity.

Figure 4:
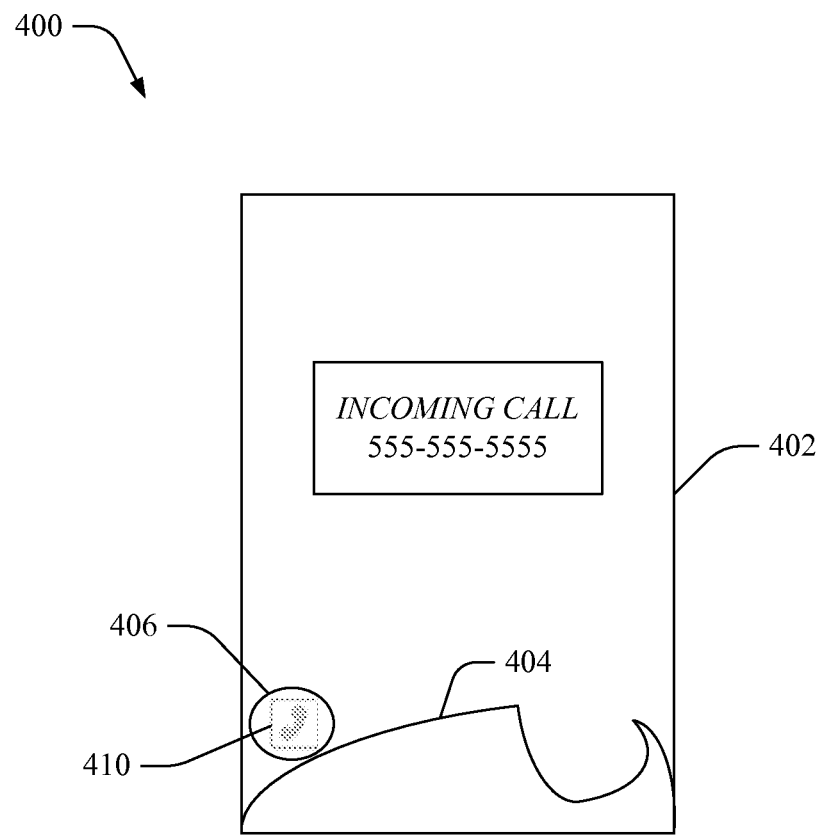
FIG. 4 depicts a diagram of an exemplary communication device comprising a user interface (UI) display screen displaying an overlay display region in accordance with various aspects and embodiments of the disclosed subject matter.

FIG. 4 illustrates a diagram of an exemplary communication device 400 comprising a UI display screen displaying an overlay display region in accordance with various aspects and embodiments of the disclosed subject matter. In an aspect, the communication device 400 can include a UI 402 that can be employed to display information and/or receive data input from a user. The UI 402 can display a lock track 404 and lock facilitator component 406 when the UI 402 or communication device 400 is/are in a sleep or inactive mode, and in a locked state. If a notification is received or generated, for example, in relation to an incoming communication, or a local application or function, an overlay display region 408 can be generated and displayed in a desired portion of the UI 402. As desired, the overlay display region 408 can be superimposed and/or emphasized over another display region(s) displayed under or around the overlay display region 408. In another aspect, the amount and/or type of information associated with the notification to be displayed in the overlay display region 408 can be controlled based at least in part on the security level(s) associated with the communication device 400, an application that provided the notification and/or the notification, and/or the amount of space available in the overlay display region 408 for presentation of information.

In another aspect, the lock facilitator component 406 can display a graphic 410 (e.g., an icon) that can correspond to the type of notification being displayed in the overlay display region 408. For example, the graphic 410 can be a phone when the notification relates to an incoming phone call (as depicted), or can be a message graphic when the notification relates to a received message.

FIG. 5 illustrates a block diagram of an exemplary security component 500 in accordance with an embodiment of the disclosed subject matter. In an aspect, the security component 500 can include a communicator component 502 that can facilitate transmitting information from the security component 500 to other desired components and receiving information from other desired components.

The security component 500 also can comprise a lock track component 504 that can facilitate generating and displaying a desired lock track on the display screen of the UI of the communication device in relation to locking and unlocking the communication device. For instance, the lock track generator component 504 can generate a lock track comprising a locked region having a desired shape and desired amount of positive slope as the lock track proceeds from the lower point of a locked region of the lock track to a higher (e.g., highest) point of the locked region, wherein the higher point can be located adjacent to an unlocked region of the lock track.

In an aspect, the security component 500 can contain a lock facilitator generator component 506 that can facilitate generating and displaying a lock facilitator, which can be configured to be movable along the lock track between the lower point of the locked region and the unlocked region. For example, the lock facilitator component can be an interactive ball that can be manipulated to move (e.g., roll) it to a desired position along the lock track and/or can be moved in a desired direction along the lock track in response to a received swipe gesture on a touch screen UI or a pressed unlock key on a keyboard.

In another aspect, the security component 500 can include a detector component 508 that can detect input information relating to unlocking or locking the communication device, or detect notifications and associated notification-related information. In an aspect, the detector component 508 also can facilitate detecting or identifying a security level(s) associated with the communication device, an application, and/or a notification.

The security component 500 also can employ an evaluator component 510 that can evaluate the position of the lock facilitator component on the lock track to facilitate identifying whether the lock facilitator component is in the locked region or at or above the unlocked region of the lock track. In another aspect, the evaluator component 510 further can evaluate the security level(s) associated with the communication device, an application, and/or a notification to facilitate determining an operational state (e.g., last operational state, new operational state, high security state, etc.) in which to place the communication device, for example, when the communication device is unlocked, and/or an amount or type of information to display in an overlay display region of the UI.

The security component 500 can comprise an authenticator component 512 that can operate in conjunction with the evaluator component 510 to evaluate (e.g., compare) authentication credentials received from a user via the UI with stored representations of valid authentication credentials to facilitate authenticating the user and granting a specified level of access to the communication device and/or a desired application (and/or a notification relating to the application), based at least in part on the respective security levels of the communication device and/or application (and/or a notification relating to the application), in accordance with the predefined security criteria. The authenticator component 512 can grant a specified subset of access rights to an authenticated user in accordance with the applicable security level(s) and predefined security criteria.

The security component 500 can include an overlay security component 514 that can operate in conjunction with the evaluator component 510 to facilitate determining or identifying a desired portion of information (e.g., desired amount and/or type of information) relating to a notification (e.g., generated notification, received notification) that can be displayed in an overlay display region in relation to the notification (and conversely, can identify the portion of the information that is not to be displayed in the overlay display region), in accordance with the identified security level(s) of the communication device, application, and/or notification and the predefined security criteria. In another aspect, the security component 500 can contain a selector component 516 that can be employed to select desired pieces of the information relating to the notification, based at least in part on the determinations or identifications rendered by the evaluator component 510 and/or overlay security component 514.

In still another aspect, the security component 500 can comprise an icon generator component 518 that can be employed to generate and display a desired icon in or on the lock facilitator component based at least in part on (e.g., corresponding to) the state of the communication device lock, a received or generated notification, or an application. For example, the icon generator component 518 can generate and display a locked lock on the lock facilitator component when the communication device lock is in the locked state or an unlocked lock on the lock facilitator component when the communication device lock is in the unlocked state. As another example, when the communication device is in the locked state and a notification is received or generated, the icon generator component 518 can modify the locked lock icon to another icon corresponding to the notification (e.g., a phone icon when the notification relates to an incoming phone call, a message icon when the notification relates to an incoming message, an alarm clock when the notification relates to a triggered alarm clock, etc.)

In yet another aspect, the security component 500 can employ a processor component 520 that can be configured to confer functionality, at least in part, to substantially any electronic component within the security component 500, in accordance with aspects of the disclosed subject matter. The processor component 520 can employ one or more processors, microprocessors, or controllers that can process data (e.g., symbols, bits, or chips), such as information relating to generating and displaying a lock track, generating and displaying a lock facilitator component, detecting information, evaluating information, authenticating a user, identifying information that can be displayed in an overlay display region, etc., or information relating to other operations of the security component 500, etc., to facilitate operation of the security component 500, as more fully disclosed herein, and control data flow between the security component 500 and other components (e.g., UI, etc.) associated with the security component 500.

The security component 500 also can include a data store 522 that can store data structures (e.g., user data, application data, metadata, etc.); code structure(s) (e.g., modules, objects, classes, procedures) or instructions; information relating to generating and displaying a lock track, generating and displaying a lock facilitator component, detecting information, evaluating information, authenticating a user, identifying information that can be displayed in an overlay display region, etc.; predefined security criteria (and associated predefined security rules); etc., to facilitate controlling operations associated with the security component 500. In an aspect, the processor component 520 can be functionally coupled (e.g., through a memory bus) to the data store 522 in order to store and retrieve information desired to operate and/or confer functionality, at least in part, to the communicator component 502, lock track generator component 504, lock facilitator generator component 506, detector component 508, evaluator component 510, authenticator component 512, overlay security component 514, selector component 516, icon generator component 518, and/or substantially any other operational aspects of the security component 500.

Figure 6:
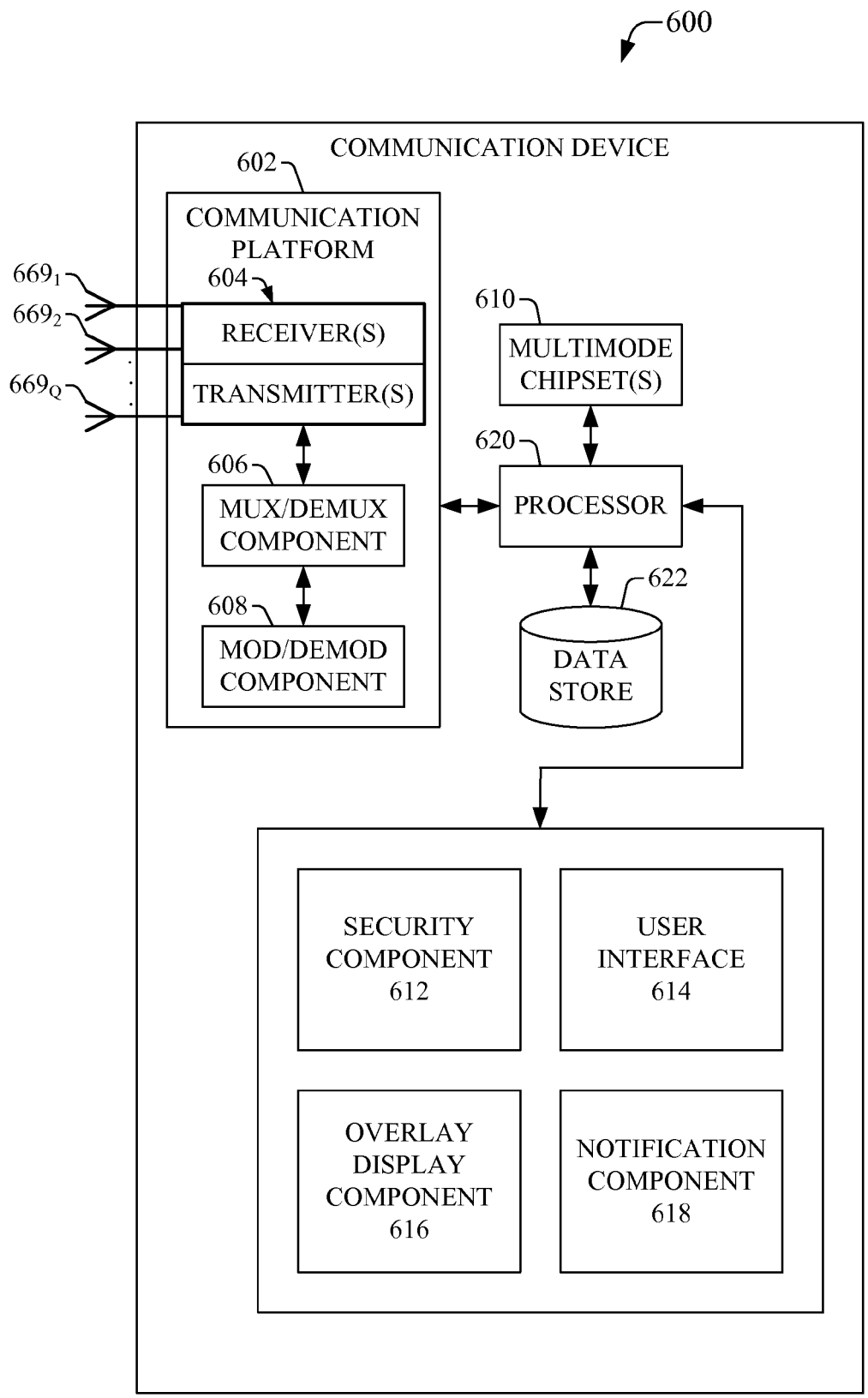
FIG. 6 depicts a block diagram of an exemplary communication device (e.g., mobile or wireless communication device) in accordance with an embodiment of the disclosed subject matter.

FIG. 6 depicts a block diagram of an exemplary communication device 600 (e.g., mobile or wireless communication device) in accordance with an embodiment of the disclosed subject matter. In an aspect, the communication device 600 can be a multimode access terminal, wherein a set of antennas $669_1$-$669_Q$ (Q is a positive integer) can receive and transmit signal(s) from and to wireless devices like access points, access terminals, wireless ports and routers, and so forth, that operate in a radio access network. It should be appreciated that antennas $669_1$-$669_Q$ are a part of communication platform 602, which comprises electronic components and associated circuitry that provide for processing and manipulation of received signal(s) and signal(s) to be transmitted; e.g., receivers and transmitters 604, multiplexer/demultiplexer (mux/demux) component 606, and modulation/demodulation (mod/demod) component 608.

In another aspect, the communication device 600 can include a multimode operation chipset(s) 610 that can allow the communication device 600 to operate in multiple communication modes in accordance with disparate technical specification for wireless technologies. In an aspect, multimode operation chipset(s) 610 can utilize communication platform 602 in accordance with a specific mode of operation (e.g., voice, GPS). In another aspect, multimode operation chipset(s) 610 can be scheduled to operate concurrently (e.g., when Q>1) in various modes or within a multitask paradigm.

In another aspect, the communication device 600 can comprise a security component 612 that can facilitate securing information associated with the communication device 600, controlling the state of the communication device lock, controlling the amount and/or type of information displayed in an overlay display region of the UI 614, authenticating users, and/or other security related functions, based at least in part on respective security levels associated with the communication device 600, application and/or notification, and predefined security criteria, as more fully described herein. In still another aspect, the communication device 600 can contain the UI 614, which can comprise one or more interfaces (e.g., display screens, touch screens, buttons, controls, switches, adapters, connectors, visual components, speakers, vibration generator, etc.) that can be utilized to facilitate presentation of information to a communication device user or receiving data input from a communication device user. In an aspect, the UI 614 can display one or more display regions (e.g., single display region, two display regions, three display regions, n display regions, wherein n can be virtually any desired positive integer number, an overlay display region(s), etc.) simultaneously on a UI display screen and/or can be a diptych UI display, a triptych UI display or an n-tych display, wherein n can be virtually any desired positive integer number.

In yet another aspect, the communication device 600 can include an overlay display component 616 that can generate and facilitate displaying an overlay display region on the UI display screen. As desired, the overlay display region can be superimposed over one or more display regions underneath the overlay display region on the UI display screen such that the overlay display region is more emphasized (e.g., fully or relatively illuminated) and the display regions underneath relatively de-emphasized (e.g., relatively dimly illuminated). Alternatively or additionally, the overlay display region can be displayed on the UI display screen such that portions of the one or more display regions underneath the overlay display region can be covered or displaced by the overlay display region such that those portions are not visible in the UI display screen. In another aspect, the overlay display region can be generated in response to a received or generated notification, and a desired amount and/or type of notification-related information can be displayed in the overlay display region.

The communication device 600 also can comprise a notification component 618 that can receive one or more notifications from one or more communication devices (e.g., mobile communication devices, application servers, social networking sites, etc.) or generate notifications relating to local applications (e.g., electronic calendar application, alarm clock application, etc.). The notification component 618 also can facilitate processing the received or generated notifications and associated notification-related information to facilitate presenting the notification and/or desired notification-related information to the communication device user via the UI display screen (e.g., overlay display region) and/or associated UI components (e.g., speakers, vibration generator, etc.).

In still another aspect, the communication device 600 also can include a processor(s) 620 that can be configured to confer functionality, at least in part, to substantially any electronic component within the communication device 600, in accordance with aspects of the subject innovation. For example, the processor(s) 620 can facilitate enabling the communication device 600 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 620 can facilitate enabling the communication device 600 to process data relating to securing the communication device 600 and information associated therewith, displaying information in the UI display screen, generating or displaying an overlay display region, generating or processing notifications and associated notification-related information, etc.

The communication device 600 also can contain a data store 622 that can store data structures (e.g., user data, application data, metadata); code structure(s) (e.g., modules, objects, classes, procedures) or instructions; message hashes; neighbor cell list; information relating to securing the communication device 600 and information associated therewith, displaying information in the UI display screen, generating or displaying an overlay display region, generating or processing notifications and associated notification-related information; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 620 can be functionally coupled (e.g., through a memory bus) to the data store 622 in order to store and retrieve information (e.g., neighbor cell list; information relating to securing the communication device 600 and information associated therewith, displaying information in the UI display screen, generating or displaying an overlay display region, generating or processing notifications and associated notification-related information; frequency offsets; desired algorithms; etc.) desired to operate and/or confer functionality, at least in part, to communication platform 602, multi-mode operation chipset(s) 610, security component 612, UI 614, overlay display component 616, notification component 618, and/or substantially any other operational aspects of the communication device 600.

Figure 7:
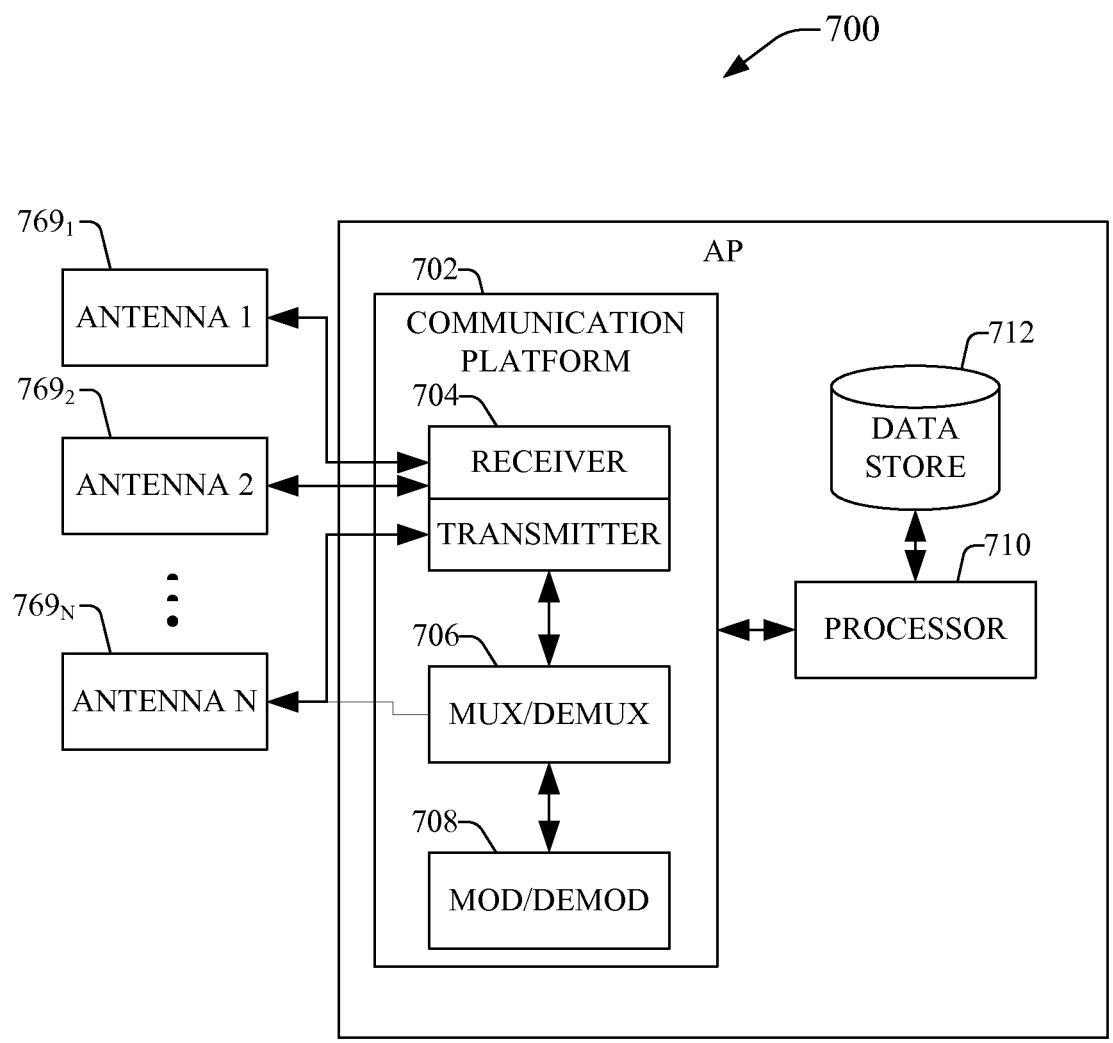
FIG. 7 illustrates an exemplary access point (AP) in accordance with an embodiment of the disclosed subject matter.

FIG. 7 depicts an exemplary AP 700 (e.g., femtocell, pico-cell, base station, etc.) in accordance with an embodiment of the disclosed subject matter. The AP 700 can receive and transmit signal(s) from and to wireless devices like access points (e.g., femtocells, picocells, base stations, etc.), access terminals (e.g., UEs), wireless ports and routers, and the like, through a set of antennas $769_1$-$769_N$. In an aspect, the antennas $769_1$-$769_N$ are a part of a communication platform 702, which comprises electronic components and associated circuitry that can provide for processing and manipulation of received signal(s) and signal(s) to be transmitted. In an aspect, the communication platform 702 can include a receiver/transmitter 704 that can convert signal from analog to digital upon reception, and from digital to analog upon transmission. In addition, receiver/transmitter 704 can divide a single data stream into multiple, parallel data streams, or perform the reciprocal operation.

In an aspect, coupled to receiver/transmitter 704 can be a multiplexer/demultiplexer (mux/demux) 706 that can facilitate manipulation of signal in time and frequency space. The mux/demux 706 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 706 can scramble and spread information (e.g., codes) according to substantially any code known in the art, e.g., Hadamard-Walsh codes, Baker codes, Kasami codes, polyphase codes, and so on. A modulator/demodulator (mod/demod) 708 also can be part of the communication platform 702, and can modulate information according to multiple modulation techniques, such as frequency modulation, amplitude modulation (e.g., M-ary quadrature amplitude modulation (QAM), with M a positive integer), phase-shift keying (PSK), and the like.

The AP 700 also can comprise a processor(s) 710 that can be configured to confer and/or facilitate providing functionality, at least partially, to substantially any electronic component in or associated with the AP 700. For instance, the processor(s) 710 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc. The processor(s) 710 also can facilitate other operations on data to facilitate managing or maintaining a white list that includes information, such as communication device identifiers associated with communication devices that can connect to the AP 700 to communicate voice or data, etc.

In another aspect, the AP 700 can include a data store 712 that can store data structures; code instructions; rate coding information; information relating to measurement of radio link quality or reception of information related thereto; information relating to establishing a communications connection between a UE and other communication device, white list information, information relating to managing or maintaining the white list; system or device information like policies and specifications; code sequences for scrambling; spreading and pilot transmission; floor plan configuration; access point deployment and frequency plans; scheduling policies; and so on. The processor(s) 710 can be coupled to the data store 712 in order to store and retrieve information (e.g., information, such as algorithms, relating to multiplexing/demultiplexing or modulation/demodulation, information relating to radio link levels, information relating to establishing communication connections associated with a UE(s) served by the AP 700, information relating to a white list, etc.) desired to operate and/or confer functionality to the communication platform 602, and/or other operational components of AP 700.

In accordance with an embodiment of the disclosed subject matter, one or more components (e.g., security component) in the communication network environment can utilize artificial intelligence (AI) techniques or methods to infer (e.g., reason and draw a conclusion based at least in part on a set of metrics, arguments, or known outcomes in controlled scenarios) whether the communication device or associated UI is to be in a locked state of an unlocked state; a security level associated with a notification and/or a communication device; an amount and/or type of information relating to a notification to present in an overlay display region; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with the systems and methods disclosed herein to facilitate rendering an inference(s) related to the systems and methods disclosed herein.

In particular, the one or more components in the communication network environment can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing techniques or methods can be applied to analysis of the historic and/or current data associated with systems and methods disclosed herein to facilitate making inferences or determinations related to systems and methods disclosed herein.

In view of the example systems described herein, example methodologies that can be implemented in accordance with the disclosed subject matter can be better appreciated with reference to flowcharts in FIGS. 8-12. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. It should be further appreciated that the methodologies disclosed throughout the subject specification are capable of being stored on an article of manufacture to facilitate transporting and transferring such methodologies to computers for execution by a processor or for storage in a memory. In various embodiments, the methodologies disclosed herein can include executing computer-readable instructions stored on a computer-readable storage medium for performing various actions.

Figure 8:
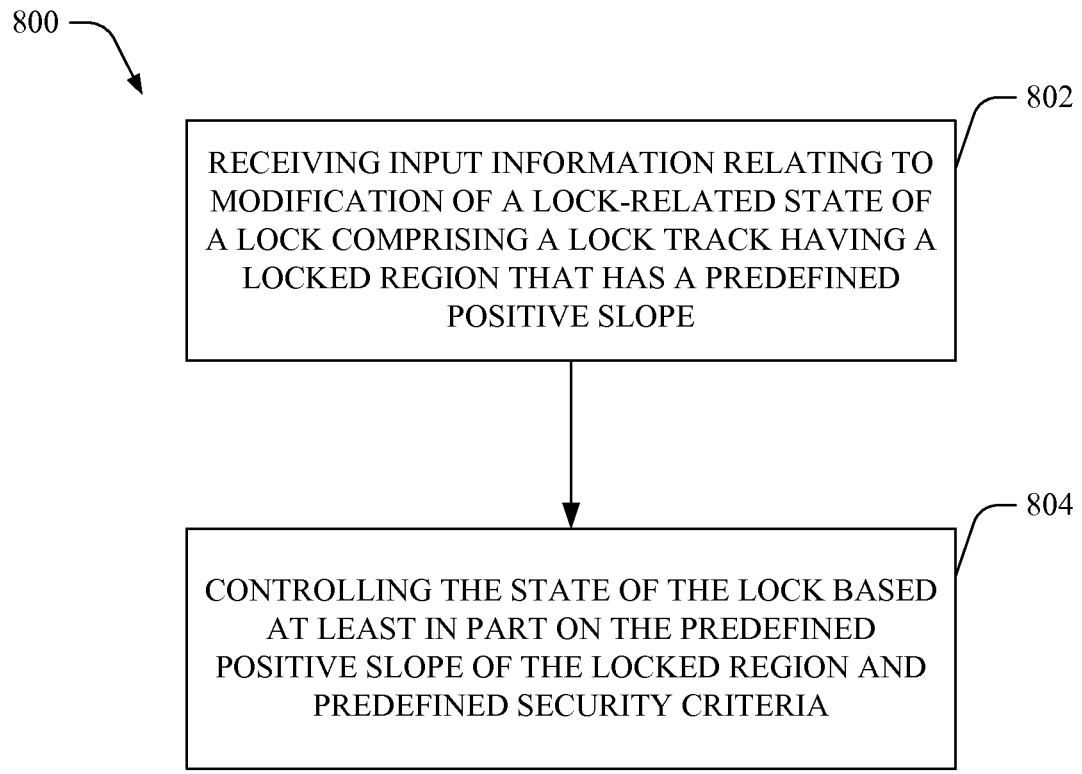
FIG. 8 illustrates a flowchart of an exemplary methodology for controlling a lock-related state of a communication device or associated UI in accordance with various aspects and embodiments of the disclosed subject matter.

FIG. 8 illustrates a flowchart of an exemplary methodology 800 for controlling a lock-related state of a communication device or associated UI in accordance with various aspects and embodiments of the disclosed subject matter. At 802, input information relating to modification of a lock-related state of a lock comprising a lock track having a locked region that has a predefined positive slope can be received, wherein the lock is associated with the communication device or associated UI. In an aspect, the lock track can be displayed in the UI of the communication device, wherein the lock track can comprise the positive-sloped lock region and an unlocked region (e.g. chasm) that can be adjacent to a higher (e.g., highest) point of the positive-sloped lock region. Input information (e.g., swipe right gesture, manipulating a lock facilitator component displayed on the lock track to move the lock facilitator component to the desired position on the lock track, tapping gesture in the region of the lock track to which movement of the lock facilitator component is desired, etc.) can be received via the UI (e.g., touch screen).

At 804, the state of the lock can be controlled based at least in part on the predefined positive slope of the locked region and predefined security criteria. For instance, when the lock is in the locked state, if the lock facilitator component is moved along the lock track from a lower (e.g., lowest) point of the positive-sloped locked region beyond the higher point of the locked region to a position at or over the locked region, in response to the received input information, the lock can be changed from a locked state to an unlocked state and the communication device or associated UI can be unlocked. In another aspect, when the lock is in the locked state, if, in response to the received input information, the lock facilitator component is moved along the lock track from a lower point of the positive-sloped locked region, but the input information does cause the lock facilitator component to move to a position beyond the higher point of the locked region, the lock facilitator component can move or roll back down the lock track to the lower point of the locked region from the position on the lock track to which it was moved, and can rest at the lower point. As a result, the state of the lock can remain in a locked state, and thus, the communication device or associated UI can remain in the locked state.

Figure 9:
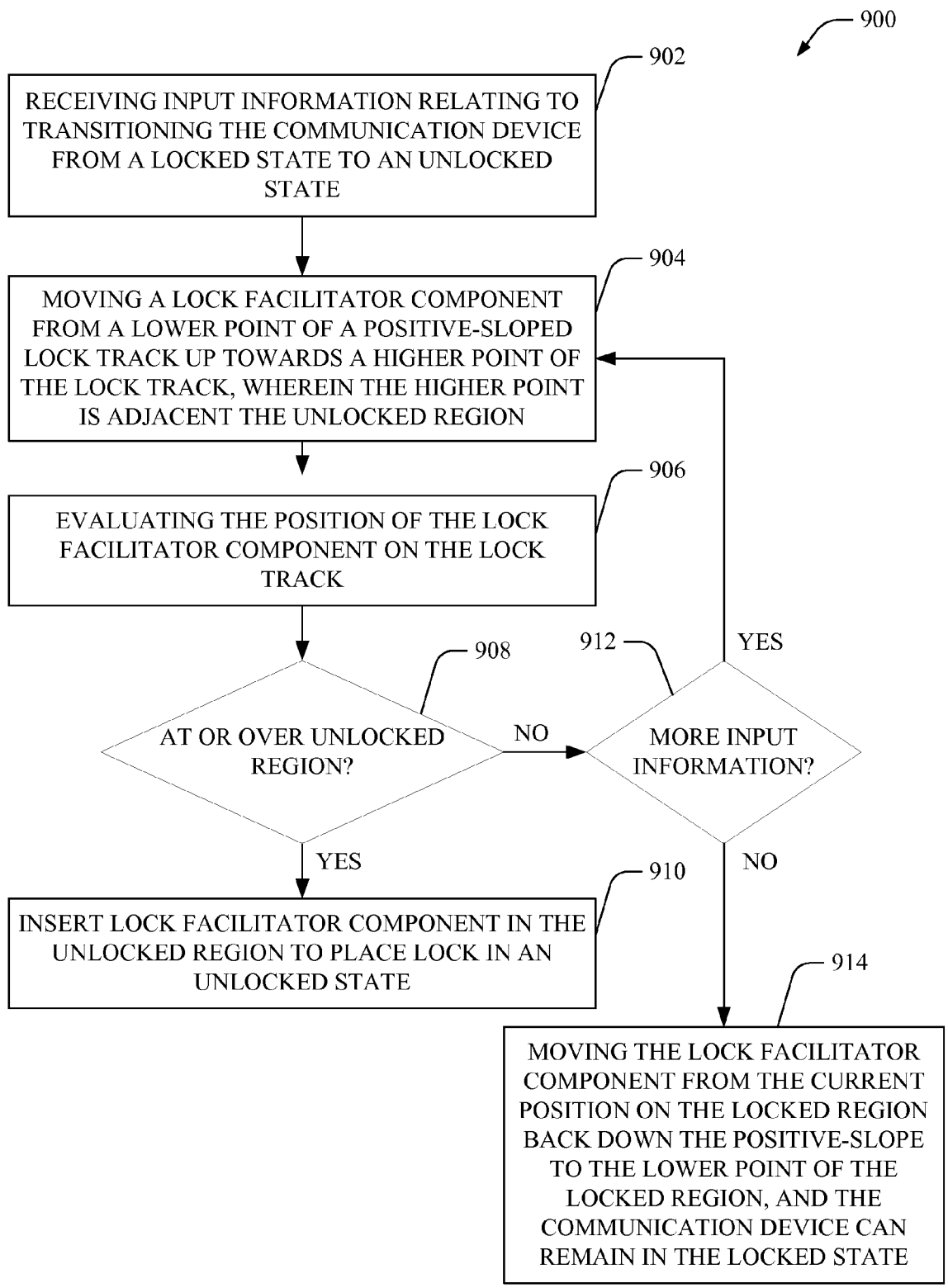
FIG. 9 depicts a flowchart of an exemplary methodology for controlling a lock-related state of a communication device or associated UI in accordance with aspects of the disclosed subject matter.

FIG. 9 illustrates a flowchart of an exemplary methodology 900 for controlling a lock-related state of a communication device or associated UI in accordance with aspects of the disclosed subject matter. At 902, input information (e.g., swipe right gesture, manipulating a lock facilitator component displayed on the lock track to move the lock facilitator component to the desired position on the lock track, tapping gesture in the region of the lock track to which movement of the lock facilitator component is desired, etc.) relating to transitioning the communication device from a locked state to an unlocked state can be received, for example, via the UI. In an aspect, the input information can be employed to facilitate moving a lock facilitator component (e.g., interactive ball).

At 904, a lock facilitator component can be moved from a lower point of a positive-sloped lock track up towards a higher point of the lock track, wherein the higher point is adjacent the unlocked region. At 906, the position of the lock facilitator component on the lock track can be evaluated. For instance, the position of the lock facilitator component in relation to the lock track can be monitored by the security component. In an aspect, the security component can evaluate (e.g., continuously, periodically or at selected times) the position of the lock facilitator component in relation to the lock track to facilitate determining whether the lock facilitator component is at the unlocked region of the lock track.

At 908, a determination can be made regarding whether the lock facilitator component is positioned (e.g., located) at or over the unlocked region of the lock track. If it is determined that the lock facilitator component is positioned at or over the unlocked region (e.g., if the lock facilitator component is identified as being positioned at or over the unlocked region), at 910, the lock facilitator component can be moved (e.g., dropped) or placed in the unlocked region (e.g., chasm), and the communication device can thereby be transitioned from the locked state to the unlocked state (or to a high security display screen wherein authentication credentials can be presented to facilitate unlocking the communication device, when, for example, the communication device or application is at a high security level). When the communication device is transitioned from the locked state, the communication device can be placed in the last operational state, a new operational state, or the high security display screen, in accordance with the predefined security criteria.

If, at 908, it is determined that the lock facilitator component is not at or over the unlocked region, at 912, a determination can be made regarding whether input information is being received or processed. For instance, it can be determined whether there is still more input information relating to unlocking the communication device that is being received or processed by the security component. If, at 912, it is determined that there is no input information being received or processed, at 914, the lock facilitator component can be moved (e.g., rolled) from the current position on the locked region on the lock track back down the positive-sloped locked region to the lower point (e.g., rest position) of the locked region, and the communication device can remain in the locked state. If, at 912, it is determined that there is more input information being received or processed, methodology 900 can return to act 904, wherein the lock facilitator component can continue to be moved up towards the higher point of the positive-sloped lock track.

Figure 10:
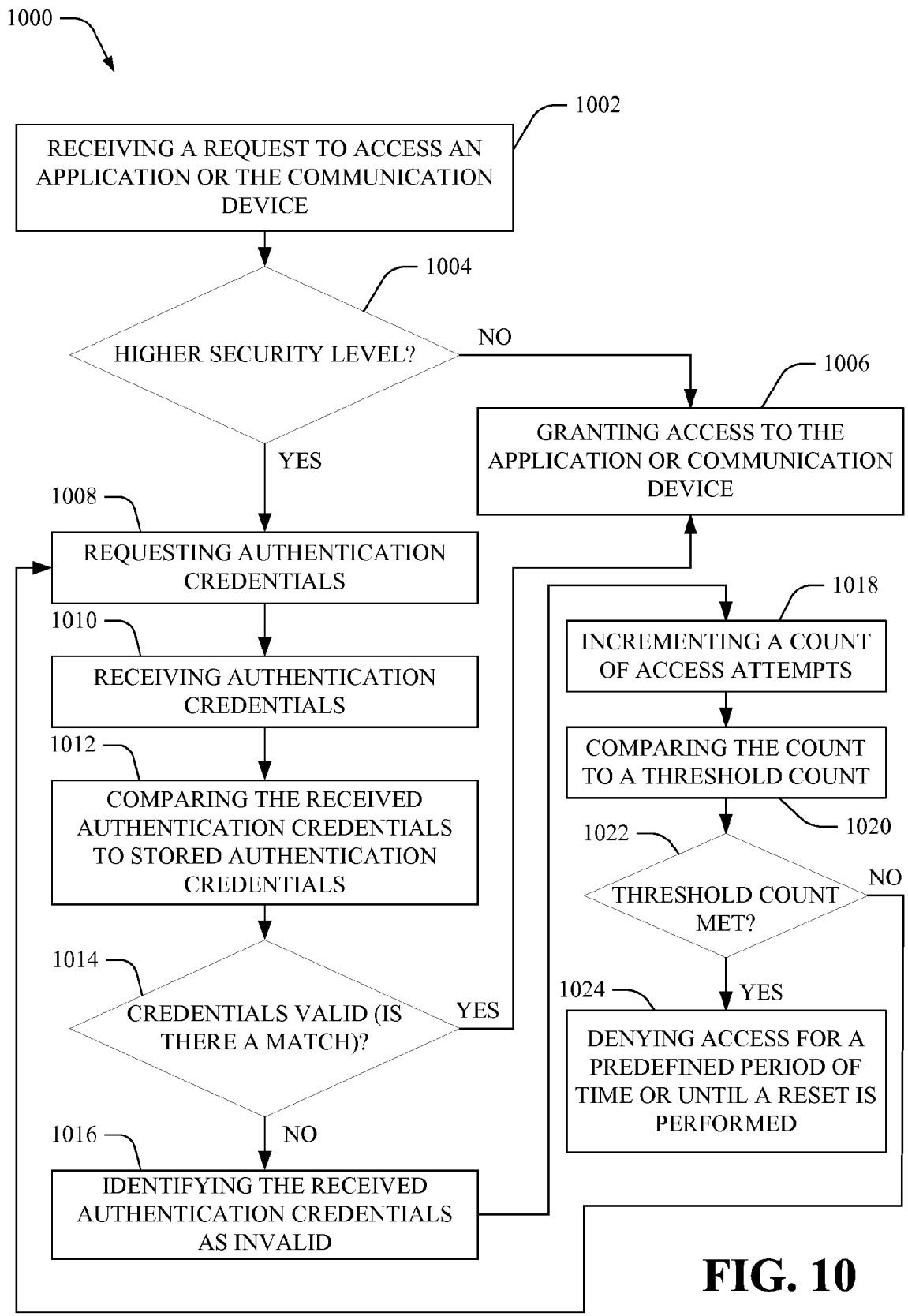
FIG. 10 illustrates a flowchart of an exemplary methodology for controlling the lock-related state of the communication device in accordance with aspects described herein.

FIG. 10 illustrates a flowchart of an exemplary methodology 1000 for controlling the lock-related state of the communication device in accordance with aspects described herein. At 1002, a request to access an application or the communication device can be received. For instance, the request to access the communication device can be in the form of moving the lock facilitator component from the locked region to the unlocked region. The request to access the application can be in the form of moving the lock facilitator component from the locked region to the unlocked region and/or pressing a button associated with initiating or accessing the application.

At 1004, a determination can be made regarding whether the application or communication device is subject to a higher (e.g., high) security level. For instance, one or more of the application or communication device can have a respective security parameter set to a higher security level (e.g., at least a predefined threshold security level), which can require a desired authorization from the security component in order to access the application or communication device. If it is determined that the respective security levels of the application and communication device are not at a higher security level (e.g., are at a low security level), at 1006, access can be granted to the application or communication device.

If, at 1004, it is determined that the security level associated with the application or the security level associated with the communication device is set at the higher security level, at 1008, a request or prompt for authentication credentials can be provided (e.g., displayed). In an aspect, the security component can facilitate displaying a high security display screen wherein authentication credentials can be entered by a user.

At 1010, authentication credentials can be received, for example, via the UI. For instance, the authentication credentials of the user can be received via the UI and can be placed in the appropriate field(s) of the high security display screen. At 1012, the received authentication credentials can be compared to stored authentication credentials. In an aspect, one or more valid representations of authentication credentials can be stored in a data store associated with the security component. The security component can retrieve one or more stored authentication credentials from the data store, and can evaluate (e.g., compare) the received authentication credentials in relation to the stored authentication credentials to determine whether the received authentication credentials match a valid representation of authentication credentials.

At 1014, a determination can be made regarding whether the received authentication credentials are valid. If, at 1014, it is determined that the received authentication credentials match a valid representation of authentication credentials (e.g., stored authentication credentials), the received authentication credentials can be determined to be, or identified as, valid, and methodology 1000 can proceed to act 1006, wherein access can be granted to the application or communication device.

If, at 1014, it is determined that the received authentication credentials do not match a valid representation of authentication credentials (e.g., stored authentication credentials), at 1016, the received authentication credentials can be determined to be, or identified as, invalid. At 1018, a count of the number of attempts to access the application or communication device (e.g., during the current session) can be incremented (e.g., increased by one).

At 1020, the count of the number of attempts to access can be compared with a predefined maximum threshold number of unsuccessful access attempts. The security component can retrieve the predefined maximum threshold number of unsuccessful access attempts from the data store, and can compare the current count of the number of unsuccessful access attempts to the predefined maximum threshold number of unsuccessful access attempts to facilitate determining whether the predefined maximum threshold number of unsuccessful access attempts has been met. At 1022, a determination can be made as to whether the predefined maximum threshold number of unsuccessful access attempts has been met. If it is determined that the predefined maximum threshold number of unsuccessful access attempts has been met, at 1024, access to the application or communication device can be denied, for example, for at least a predefined period of time (e.g., 5 minutes, 10 minutes, 1 hour, 1 day, . . . ) or until a reset is performed. If, at 1022, it is determines that the current count of the number of unsuccessful access attempts has not reached (e.g., has not met) the predefined maximum threshold number of unsuccessful access attempts, methodology 1000 can return to act 1008, wherein a request or prompt for authentication credentials again can be provided (e.g., displayed), and methodology 1000 can proceed from that point. As desired, a notification also can be presented on the display screen (e.g., high security display screen) to inform the user that the received authentication credentials were identified as not being valid.

Figure 11:
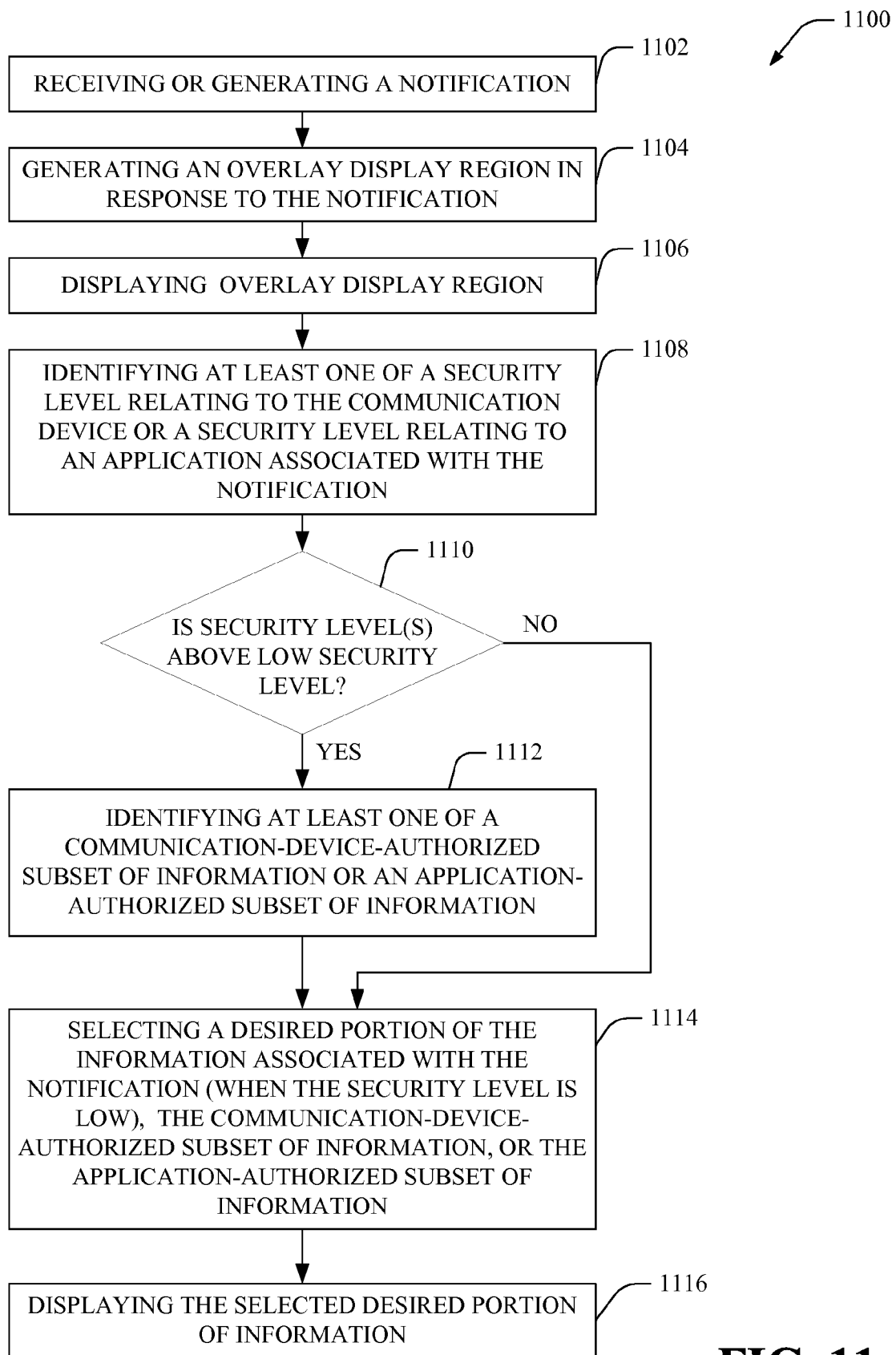
FIG. 11 depicts a flowchart of an exemplary methodology for securely controlling information displayed in an overlay display region of a communication device in accordance with aspects described herein.

FIG. 11 illustrates a flowchart of an exemplary methodology 1100 for securely controlling information displayed in an overlay display region of a communication device in accordance with aspects described herein. In an aspect, at a given time, the communication device or associated UI can be in a sleep mode and/or locked mode (e.g., locked state), or can be in an active or awake mode and/or in a locked mode or unlocked mode. At 1102, a notification can be received or generated. In an aspect, a notification can be received by, or generated by, the communication device. For instance, a remote application and/or remote communication device can transmit a notification, comprising a subset of information, to the communication device or an application (e.g., alarm clock application, electronic calendar application, etc.) located (e.g., stored) on the communication device can facilitate generating a notification, comprising a subset of information.

At 1104, an overlay display region can be generated in response to the notification. In an aspect, an overlay display region can be generated, wherein the overlay display region can have a size and shape that can be predefined (e.g., predefined without regard to the subset of information associated with the notification) or can be selected based at least in part on the amount and/or type of information from the subset of information associated with the notification that is to be displayed in the overlay display region, the size and shape of the display screen of the UI, and/or the size(s) and shape(s) of another display region(s). At 1106, the overlay display region can be displayed in the UI. In an aspect, the overlay display region can be displayed on a desired portion of the display screen. As desired, the overlay display region can be superimposed over the display region(s) underneath the overlay display region in the UI, wherein, for example, the overlay display region can be more emphasized (e.g., brighter display) and a display region(s) underneath the overlay display region can be de-emphasized (e.g., display of such region(s) can be more dim as compared to the overlay display region), or the overlay display region can be displayed over a display region(s) underneath such that the portion(s) of the display region(s) that is under the overlay display region can be covered by the overlay display region so that the portion(s) of the display region(s) underneath cannot be viewed by the user. Typically, the overlay display region will not cover the lock track or lock facilitator component in the UI display screen when the communication device (or associated UI) is in the locked state.

At 1108, at least one of a security level relating to the communication device or a security level relating to an application associated with the notification can be identified. In an aspect, the security component can be employed to set a communication-device security level and/or an application security level for respective applications. Also, a remote entity associated with a remote application can specify and set an application security level with regard to information associated with a notification. A security level can be low level or high level, for example, or there can be a desired number of different levels in between the low security level and high security level.

At 1110, a determination can be made regarding whether the security level of the communication device or the security level of the application associated with the notification is above a low security level. If it is determined that the security level of the communication device and the security level of the application are not above the low security level, it can be determined there is no security-related restriction on the information that can be displayed in the overlay display region, and, in such instance, methodology 1100 can proceed to act 1114.

If, at 1110, it is determined that the security level of the communication device or the security level of the application is/are above the low security level (e.g., is/are at a higher (e.g., high) security level), at 1112, at least one of a communication-device-authorized subset of information or an application-authorized subset of information can be identified, selected, and/or generated based at least in part on the respectively identified security level of the communication device or security level of the application. The security component can parse the subset of information and can identify, select, and/or generate a portion of information the communication-device-authorized subset of information or the application-authorized subset of information, based at least in part on the amount and/or type(s) of information in the subset of notification information and the respectively identified security levels of the communication device and the application, in accordance with the predefined security criteria.

At 1114, a desired portion of the subset of the information associated with the notification (when the security level(s) is low), or a desired portion of the communication-device-authorized subset of information or the application-authorized subset of information (as identified or generated at act 1112) (when the security level(s) is above low), can be identified, selected, and/or generated based at least in part on the available amount of display space in the overlay display region. For example, depending in part on how much display space is available in the overlay display region, information associated with the notification can or may be truncated or removed, if there is more notification information (e.g., authorized notification information) than the display space is able to display. Additionally or alternatively, the display region can display and scroll (e.g., with wrap-around) a desired portion of the subset of the information associated with the notification, or a desired portion of the communication-device-authorized subset of information or the application-authorized subset of information, in the overlay display region.

At 1116, the desired portion of the subset of the information associated with the notification (when the security level(s) is low), or the desired portion of the communication-device-authorized subset of information or the application-authorized subset of information (when the security level is above low) can be displayed, for example, in the overlay display region. The displayed portion of the notification information can be viewed in the overlay display region of the UI by the user, wherein the user can take a desired action in response to the notification.

In an aspect, when the lock facilitator component is displayed in the UI when the notification is received or generated, for example, when the communication device or UI is in locked mode, the graphic (e.g., icon) displayed in the lock facilitator component can be modified from the lock icon (e.g., a lock graphic shown in the locked state) to another graphic, which can correspond to the type of notification being received or generated. For example, if the notification relates to an alarm clock being triggered, the graphic in the lock facilitator component can change to a graphic of an alarm clock; if the notification relates to an incoming phone call, the graphic can change to a phone icon; if the notification relates to an incoming message (e.g., text message), the graphic can change to a message icon; etc.

Figure 12:
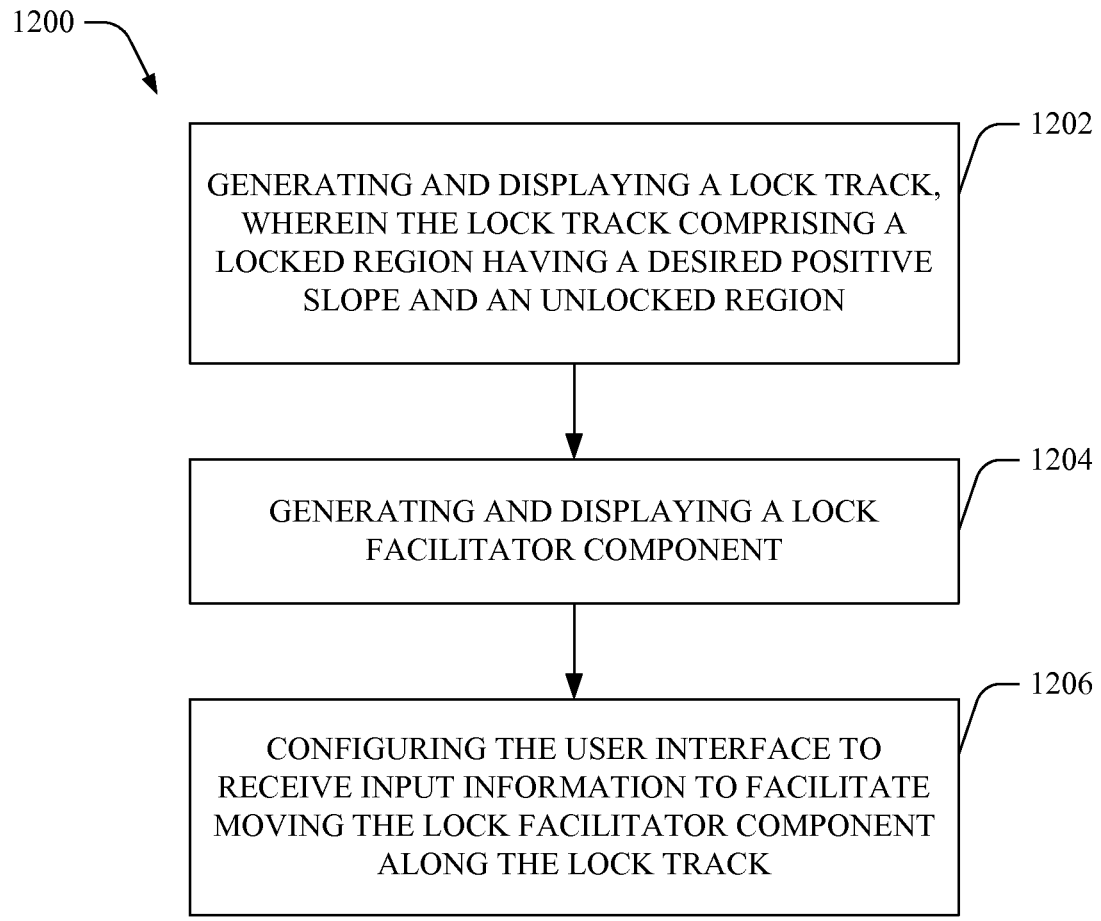
FIG. 12 illustrates a flowchart of an exemplary methodology for generating and displaying a lock track and lock facilitator component to facilitate controlling a lock-related state of a communication device and/or an associated UI in accordance with aspects described herein.

FIG. 12 illustrates a flowchart of an exemplary methodology 1200 for generating and displaying a lock track and lock facilitator component to facilitate controlling a lock-related state of a communication device and/or an associated UI in accordance with aspects described herein. At 1202, a lock track can be generated and displayed, for example, in a display screen of a UI, wherein the lock track can comprise a locked region having a desired positive slope and associated with a locked state, and an unlocked region that can include a chasm or recess, wherein the unlocked region can be adjacent to a higher (e.g., highest) point of the positive slope of the locked region. On the opposite side of the unlocked region, the locked region can have a lower (e.g., lowest) point of the positive sloped locked region of the lock track, wherein the lower point can be at a lower height than the higher point of the locked region.

At 1204, a lock facilitator component can be generated and displayed, for example, in the display screen of the UI, wherein the lock facilitator can be configured to be movable along the lock track between the lower point of the locked region and the unlocked region. In an embodiment, the lock facilitator component can be further configured to display one or more icons, wherein the icon displayed at a given time can correspond to a current state of the communication device lock and/or a type of communication or notification being presented in the UI, such as more fully disclosed herein.

At 1206, the UI can be configured to receive input information (e.g., swipe right gesture, tapping gesture, keystroke, etc.) to facilitate moving the lock facilitator component along the lock track between the lower point of the locked region and the unlocked region, to facilitate transitioning the communication device lock between a locked state and an unlocked state.

Figure 13:
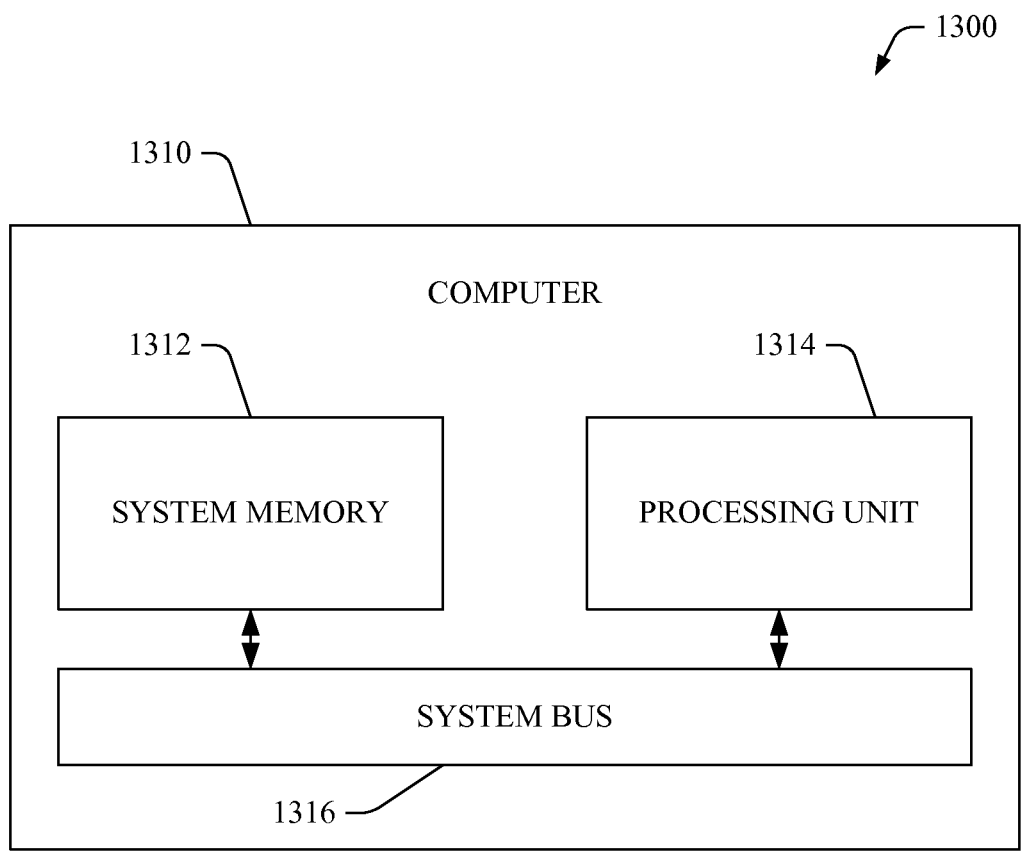
FIG. 13 illustrates an exemplary operating environment that facilitates the systems, apparatus, and methods described herein.

FIG. 13 illustrates an exemplary operating environment that facilitates the systems, apparatus and methods described herein. In order to provide additional context for various aspects of the embodiments described herein, FIG. 13 and the following discussion are intended to provide a brief, general description of a computing environment 1300 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable storage media. Computer-readable storage media can be any available media that can be accessed by the computer and includes both volatile and non-volatile media, removable and non-removable media. By way of example, and not limitation, computer-readable storage media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of communication media derived from computer-readable storage media and capable of subsequently propagating through electrically conductive media, (e.g., such as a system bus, microprocessor, data port, and the like) and/or non-electrically conductive media (e.g., in the form of radio frequency microwave frequency, optical frequency and similar electromagnetic frequency modulated data signals).

In accordance with various aspects, the computing environment 1300 for implementing various aspects includes a computer 1310, the computer 1310 including a processing unit 1314, a system memory 1312 and a system bus 1316. The system bus 1316 couples system components including, but not limited to, the system memory 1312 to the processing unit 1314. The processing unit 1314 can be any of various commercially available processors, such a single core processor, a multi-core processor, or any other suitable arrangement of processors. The system bus 1316 can be any of several types of bus structure that can further interconnect to a memory bus (with or without a memory controller), a peripheral bus, and a local bus using any of a variety of commercially available bus architectures. The system memory 1312 can include read-only memory (ROM), random access memory (RAM), high-speed RAM (such as static RAM), EPROM, EEPROM, flash memory, and/or the like. Additionally or alternatively, the computer 1302 can include a hard disk drive, upon which program instructions, data, and the like can be retained. Moreover, removable data storage can be associated with the computer 1310. Hard disk drives, removable media, computer-readable storage media, etc. can be communicatively coupled to the processing unit 1314 by way of the system bus 1316.

The system memory 1312 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1310 through one or more wired/wireless input devices, such as a keyboard, pointing and clicking mechanism, pressure sensitive screen, microphone, joystick, stylus pen, etc. A monitor or other type of interface can also be connected to the system bus 1316.

The computer 1310 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1310 can connect to other devices/networks by way of antenna, port, network interface adaptor, wireless access point, modem, and/or the like.

The computer 1310 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a desired location (e.g., couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11 (a, b, g, etc.) to provide secure, reliable, fast wireless connectivity. A WiFi network can be used to connect communication devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 14:
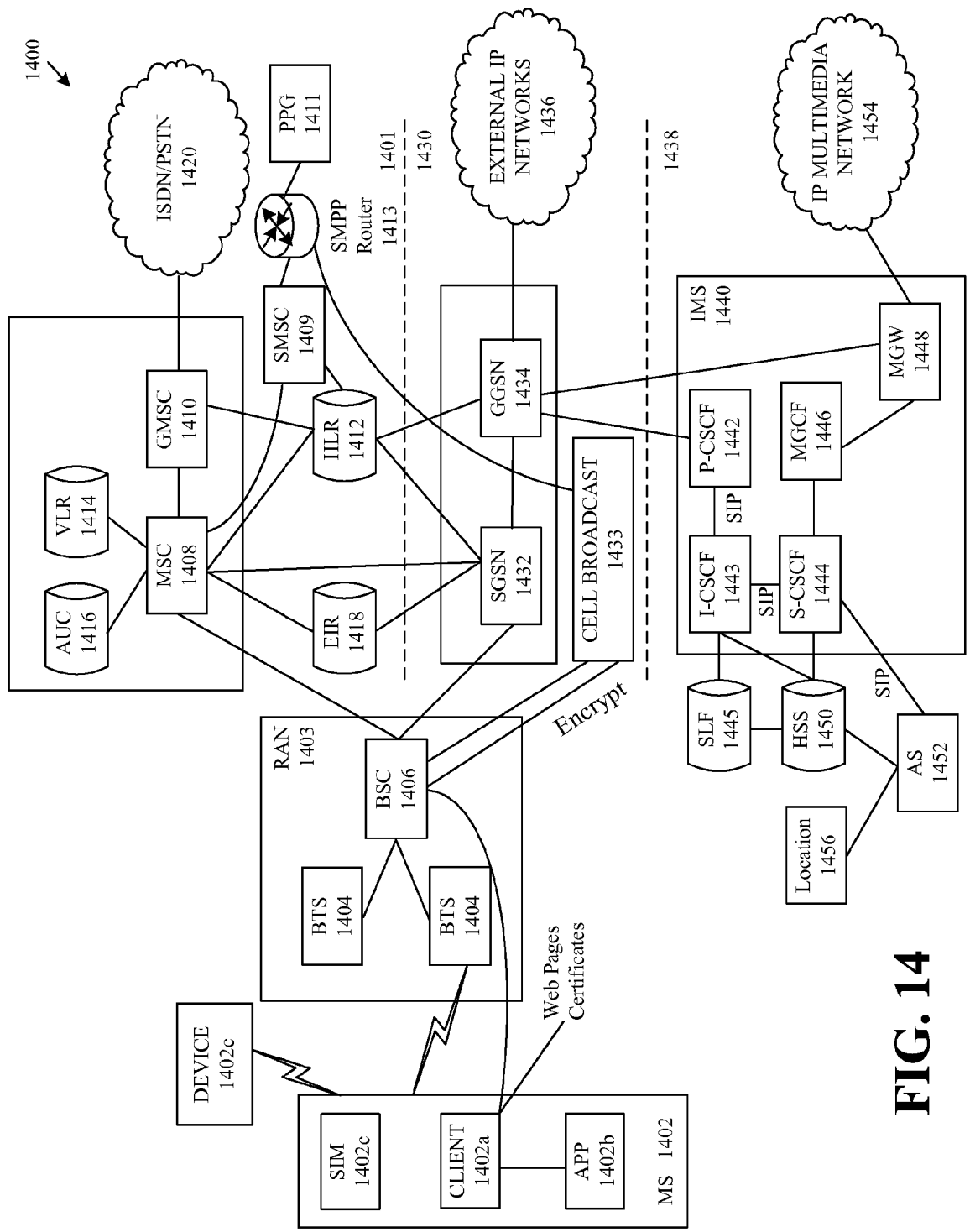
FIG. 14 illustrates an exemplary network environment that facilitates the systems, apparatus, and methods described herein.

FIG. 14 illustrates an exemplary network environment that facilitates the systems, apparatus and methods described herein. FIG. 14 depicts a GSM/GPRS/IP multimedia network architecture 1400 that includes a GSM core network 1401, a GPRS network 1430 and an IP multimedia network 1438. The GSM core network 1401 includes a Mobile Station (MS) 1402, at least one Base Transceiver Station (BTS) 1404 and a Base Station Controller (BSC) 1406. The MS 1402 is physical equipment or Mobile Equipment (ME), such as a mobile phone or a laptop computer that is used by mobile subscribers, with a Subscriber identity Module (SIM) 1402c. The SIM 1402c includes an International Mobile Subscriber Identity (IMSI), which is a unique device identifier of a subscriber. The MS 1402 includes an embedded client 1402a that receives and processes messages received by the MS 1402. The embedded client 1402a can be implemented in JAVA and is discuss more fully below.

The embedded client 1402a communicates with an application (APP) 1402b that provides services and/or information to an end user. One example of the application can be navigation software that provides near real-time traffic information that is received via the embedded client 1402a to the end user. The navigation software can provide road conditions, suggest alternate routes, etc., based at least in part on the location of the MS 1402. Those of ordinary skill in the art understand that there are many different methods and systems of locating an MS 1402.

Alternatively, the MS 1402 and a device 1402c can be enabled to communicate via a short-range wireless communication link, such as Bluetooth™ For example, a Bluetooth™ SIM Access Profile can be provided in an automobile (e.g., device 1402c) that communicates with the SIM 1402c in the MS 1402 to enable the automobile's communications system to pull information from the MS 1402. The Bluetooth™ communication system in the vehicle becomes an "embedded phone" that employs an antenna associated with the automobile. The result is improved reception of calls made in the vehicle. As one of ordinary skill in the art would recognize, an automobile is one example of the device 1402c. There can be an endless number of devices 1402c that use the SIM within the MS 1402 to provide services, information, data, audio, video, etc. to end users.

The BTS 1404 is physical equipment, such as a radio tower, that enables a radio interface to communicate with the MS. Each BTS can serve more than one MS. The BSC 1406 manages radio resources, including the BTS. The BSC can be connected to several BTSs. The BSC and BTS components, in combination, are generally referred to as a base station (BSS) or radio access network (RAN) 1403.

The GSM core network 1401 also includes a Mobile Switching Center (MSC) 1408, a Gateway Mobile Switching Center (GMSC) 1410, a Home Location Register (HLR) 1412, Visitor Location Register (VLR) 1414, an Authentication Center (AuC) 1418, and an Equipment Identity Register (EIR) 1416. The MSC 1408 performs a switching function for the network. The MSC also performs other functions, such as registration, authentication, location updating, handovers, and call routing. The GMSC 1410 provides a gateway between the GSM network and other networks, such as an Integrated Services Digital Network (ISDN) or Public Switched Telephone Networks (PSTNs) 1420. In other words, the GMSC 1410 provides interworking functionality with external networks.

The HLR 1412 is a database or component(s) that comprises administrative information regarding each subscriber registered in a corresponding GSM network. The HLR 1412 also includes the current location of each MS. The VLR 1414 is a database or component(s) that contains selected administrative information from the HLR 1412. The VLR contains information necessary for call control and provision of subscribed services for each MS currently located in a geographical area controlled by the VLR. The HLR 1412 and the VLR 1414, together with the MSC 1408, provide the call routing and roaming capabilities of GSM. The AuC 1416 provides the parameters needed for authentication and encryption functions. Such parameters allow verification of a subscriber's identity. The EIR 1418 stores security-sensitive information about the mobile equipment.

A Short Message Service Center (SMSC) 1409 allows one-to-one Short Message Service (SMS) messages to be sent to/from the MS 1402. A Push Proxy Gateway (PPG) 1411 is used to "push" (e.g., send without a synchronous request) content to the MS 1402. The PPG 1411 acts as a proxy between wired and wireless networks to facilitate pushing of data to the MS 1402. A Short Message Peer to Peer (SMPP) protocol router 1413 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1402 sends a location update including its current location information to the MSC/VLR, via the BTS 1404 and the BSC 1406. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1430 is logically implemented on the GSM core network architecture by introducing two packet-switching network nodes, a serving GPRS support node (SGSN) 1432, a cell broadcast and a Gateway GPRS support node (GGSN) 1434. The SGSN 1432 is at the same hierarchical level as the MSC 1408 in the GSM network. The SGSN controls the connection between the GPRS network and the MS 1402. The SGSN also keeps track of individual MS's locations and security functions and access controls.

A Cell Broadcast Center (CBC) 1433 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1434 provides a gateway between the GPRS network and a public packet network (PDN) or other IP networks 1436. In embodiments, the GGSN provides interworking functionality with external networks, and sets up a logical link to the MS through the SGSN. When packet-switched data leaves the GPRS network, it is transferred to an external TCP-IP network 1436, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1430 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (e.g., voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vice versa.

The IP multimedia network 1438 was introduced with 3GPP Release 5, and includes an IP multimedia subsystem (IMS) 1440 to provide rich multimedia services to end users. A representative set of the network entities within the IMS 1440 are a call/session control function (CSCF), a media gateway control function (MGCF) 1446, a media gateway (MGW) 1448, and a master subscriber database, called a home subscriber server (HSS) 1450. The HSS 1450 can be common to the GSM network 1401, the GPRS network 1430 as well as the IP multimedia network 1438.

The IP multimedia system 1440 is built around the call/session control function, of which there are three types: an interrogating CSCF (I-CSCF) 1443, a proxy CSCF (P-CSCF) 1442, and a serving CSCF (S-CSCF) 1444. The P-CSCF 1442 is the MS's first point of contact with the IMS 1440. The P-CSCF 1442 forwards session initiation protocol (SIP) messages received from the MS to an SIP server in a home network (and vice versa) of the MS. The P-CSCF 1442 can also modify an outgoing request according to a set of rules defined by the network operator (e.g., address analysis and potential modification).

The I-CSCF 1443 forms an entrance to a home network and hides the inner topology of the home network from other networks and provides flexibility for selecting an S-CSCF. The I-CSCF 1443 can contact a subscriber location function (SLF) 1445 to determine which HSS 1450 to use for the particular subscriber, if multiple HSS 1450 are present. The S-CSCF 1444 performs the session control services for the MS 1402. This includes routing originating sessions to external networks and routing terminating sessions to visited networks. The S-CSCF 1444 also decides whether an application server (AS) 1452 is required to receive information on an incoming SIP session request to ensure appropriate service handling. This decision is based on information received from the HSS 1450 (or other sources, such as an application server 1452). The AS 1452 also communicates to a location server 1456 (e.g., a Gateway Mobile Location Center (GMLC)) that provides a position (e.g., latitude/longitude coordinates) of the MS 1402.

The HSS 1450 contains a subscriber profile and keeps track of which core network node is currently handling the subscriber. It also supports subscriber authentication and authorization functions (AAA). In networks with more than one HSS 1450, a subscriber location function provides information on the HSS 1450 that contains the profile of a given subscriber.

The MGCF 1446 provides interworking functionality between SIP session control signaling from the IMS 1440 and ISUP/BICC call control signaling from the external GSTN networks (not shown). It also controls the media gateway (MGW) 1448 that provides user-plane interworking functionality (e.g., converting between AMR- and PCM-coded voice). The MGW 1448 also communicates with other IP multimedia networks 1454.

In some embodiments, the IP networks 1436 described herein include networks communicatively coupled to social networking sites. As such, the networks disclosed herein can also include such IP networks 1436 and one or more social networking sites.

It is to be appreciated and understood that components (e.g., UE, AP, core network, security component, UI, overlay component, etc.), as described with regard to a particular system or methodology, can include the same or similar functionality as respective components (e.g., respectively named components, similarly named components) as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "repository", and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM)). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, the terms "component," "system," "platform," "interface," "module," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. As another example, an interface can include input/output (I/O) components as well as associated processor, application and/or API components, and can be as simple as a command line or as complex as an Integrated Development Environment (IDE). Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Furthermore, the embodiments can or may be implemented as a method, apparatus or article of manufacture using standard programming and/or engineering techniques to produce software, firmware, hardware, or any combination thereof to control a computer, apparatus or article of manufacture to implement the functionality disclosed herein. The term "article of manufacture," as used herein, is intended to encompass a computer program, or computer program product, accessible from any computer-readable device, computer-readable carrier, computer-readable media or computer-readable storage media. As known to those of ordinary skill in the art, modifications can be made to the above embodiments without departing from the spirit of the disclosure.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Moreover, the word "exemplary" is used herein to mean an example, instance or illustration. Any aspect or design described herein as "exemplary" is not to be construed as preferred or advantageous over other aspects or designs. Rather, use of the word "exemplary" is merely intended to present examples of embodiments. Further, as used herein, the term "or" is intended to mean an inclusive "or" rather than an exclusive "or". That is, unless specified otherwise, or clear from context, "X employs A or B" is intended to mean any of the inclusive permutations (e.g., X employs A, X employs B, X employs A and B). In addition, the articles "a" and "an," as used herein, should be construed to mean "one or more" unless, as specified otherwise, or clear from context, the articles are directed to only a singular form.

As used herein, the terms "infer" or "inference" refer generally to the process of reasoning about or inferring states of the system, apparatus, method, environment, and/or user from a set of observations as captured via events and/or data. By way of examples, but not limitation, inference can be employed to identify a specific context or action, or can generate a probability distribution over states. The inference can be probabilistic (e.g., the computation of a probability distribution over states of interest based on a consideration of data and events). Inference can also refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources.

What has been described above includes embodiments of claimed subject matter. It is, of course, not possible to describe every conceivable combination of components or methodologies for purposes of describing the claimed subject matter. However, one of ordinary skill in the art can recognize that many further combinations and permutations of such subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method comprising:
receiving, by a system comprising a processor, input information relating to a modification of a state of a lock, wherein the lock comprises a lock track having a locked region and an unlocked region comprising a recessed portion, the locked region has a defined positive slope relative to an edge of a display screen, and the lock is employed to facilitate controlling access to a user interface;
controlling, by the system, the state of the lock based on the input information in relation to the defined positive slope of the locked region, and a defined security criterion, wherein a lock facilitator is movable along the lock track between the locked region associated with a locked state of the lock and the unlocked region associated with an unlocked state of the lock in response to the input information; and
controlling, by the system, an amount of impedance to change the state of the lock between the locked state and the unlocked state based on the shape of the locked region, wherein the defined positive slope has a value that is defined based on a first point at an end of the locked region that is adjacent to the unlocked region and a second point that is at another end of the locked region, and the amount of impedance to change the state of the lock varies as a function of the value of the defined positive slope.

2. The method of claim 1, further comprising:
as a function of the input information, moving, by the system, the lock facilitator from the second point of the locked region of the lock track to the first point of the locked region higher than the second point, wherein the first point is adjacent to the unlocked region of the lock track;
evaluating, by the system, a position of the lock facilitator on the lock track; and
identifying; by the system, whether the lock facilitator is positioned over the unlocked region.

3. The method of claim 2, further comprising:
inserting, by the system, the lock facilitator into the unlocked region to facilitate unlocking the user interface in response to the lock facilitator being identified as positioned over the unlocked region.

4. The method of claim 2, further comprising:
determining, by the system, that the lock facilitator is not over the unlocked region;
determining, by the system, whether there is additional input information being received; and
moving, by the system, the lock facilitator down the lock track to the first second point of the locked region in response to determining that no additional input information is being received.

5. The method of claim 1, further comprising:
initiating, by the system, presentation of a home screen in response to the user interface being determined to be in the unlocked state.

6. The method of claim 1, further comprising:
determining, by the system, a security level associated with a communication device;
requesting, by the system, an authentication credential in response to the determining the security level associated with the communication device indicating the security level is a defined threshold security level; and
receiving, by the system, the authentication credential in response to the requesting.

7. The method of claim 6, further comprising:
comparing, by the system, the authentication credential to valid authentication credentials stored by the system; and
granting, by the system, access to the user interface in response to the authentication credential matching a valid authentication credential of the valid authentication credentials.

8. The method of claim 6; further comprising:
comparing, by the system, the authentication credential to valid authentication credentials stored by the system;
denying, by the system, access to the user interface in response to the authentication credential not matching any of the valid authentication credentials; and
receiving, by the system, a new authentication credential in response to a defined number of unsuccessful access attempts at authentication being determined to not have been reached.

9. The method of claim 1, further comprising:
generating, by the system, a notification comprising notification-related information;
determining, by the system, a security level associated with a communication device;
instructing, by the system, an overlay display region to be generated in the user interface; and
controlling, by the system, an amount of the notification-related information displayed in the overlay display region based on the security level associated with the communication device.

10. An apparatus comprising:
a memory to store instructions; and
a processor, coupled to the memory, that facilitates execution of the instructions to perform operations, comprising:
displaying a lock track comprising a locked portion and an unlocked portion, wherein the locked portion has a non-zero positive slope in relation to an edge of a display screen, the unlocked portion comprises a recessed region, the user interface displays a lock facilitator that is movable along the lock track between the locked portion and the unlocked portion in response to input information, the lock track facilitates control of a state of the user interface, and the locked portion is associated with a locked state and the unlocked portion is associated with an unlocked state;
controlling the state of the user interface based on an evaluation of a position of the lock facilitator in relation to the lock track, and a defined security criterion; and
controlling an amount of impedance to change the state of the user interface between the locked state and the unlocked state based on a shape of the locked portion, wherein the non-zero positive slope has a value that is defined based on a first point at an end of the locked portion that is adjacent to the unlocked portion and a second point that is at another end of the locked portion, and the amount of impedance to change the state of the user interface from the locked state to the unlocked state is based on the value of the non-zero positive slope.

11. The apparatus of claim 10, wherein the operations further comprise:
receiving the input information relating to the lock facilitator to facilitate moving the lock facilitator along the lock track; and
evaluating the position of the lock facilitator on the lock track.

12. The apparatus of claim 11, wherein the operations further comprise:
transitioning the user interface to the unlocked state in response to positioning the lock facilitator in the unlocked portion based on the input information; and
maintaining the user interface in the locked state in response to the position of the lock facilitator being determined to be at a stopping point that is in the locked portion and no further input information being detected, wherein the lock facilitator is further configured to move down the locked portion of the lock track from the stopping point to the second point of the locked portion lower than the stopping point in response to the position of the lock facilitator being determined to be in the locked portion and no further input information being detected.

13. The apparatus of claim 10, wherein the operations further comprise entering the user interface into a home state in response to transitioning the user interface to the unlocked state.

14. The apparatus of claim 10, wherein the operations further comprise:
determining whether the apparatus is associated with a defined threshold security level;
initiating display of a security display screen in response to the apparatus being determined to be associated with the defined threshold security level; and
requesting an authentication credential associated with a user identity.

15. The apparatus of claim 14, wherein the operations further comprise:
granting access to the user interface in response to the authentication credential being determined to match a valid authentication credential of valid authentication credentials.

16. The apparatus of claim 10, wherein the operations further comprise:
initiating a superposition of an overlay display region over another display region in the user interface, in response to a notification; and
controlling an amount of notification-related information displayed in the overlay display region based on a security level associated with the apparatus.

17. The apparatus of claim 10, wherein the first point is a highest point of the locked portion relative to the edge of the display screen and the second point is the lowest point of the locked portion relative to the edge of the display screen, and the amount of impedance to change the state of the user interface from the locked state to the unlocked state is higher in connection with the value of the non-zero positive slope having a higher value than the amount of impedance associated with the value of the non-zero positive slope having a lower value.

18. The apparatus of claim 10, wherein the user interface is a touch-based user interface.

19. A computer-readable storage medium storing computer-executable instructions that, in response to execution, cause a system comprising a processor to perform operations, comprising:
displaying, in a user interface, a lock track comprising a locked portion and an unlocked portion, wherein the locked portion has a non-zero slope in relation to an edge of a display screen, the locked portion increases in height as it proceeds from an initial end to an end adjacent to the unlocked portion based on the non-zero slope, and the unlocked portion comprises a recess that is lower in height relative to the edge of the display screen than the end of the locked portion adjacent to the unlocked portion;
displaying, in the user interface, a lock facilitator that is movable along the lock track between the locked portion and the unlocked portion in response to input information, wherein the lock track facilitates control of a state of the user interface, and the locked portion is associated with a locked state and the unlocked portion is associated with an unlocked state;
controlling the state of the user interface based on a comparison of a position of the lock facilitator in relation to the lock track, and a defined security criterion; and
controlling an amount of impedance to change the state of the user interface between the locked state and the unlocked state based on a shape of the locked portion, wherein the amount of impedance to change the state of the user interface from the locked state to the unlocked state is higher in connection with the non-zero slope having a higher value than the amount of impedance associated with the non-zero slope having a lower value.

20. The computer-readable storage medium of claim 19, wherein the operations further comprise:
facilitating a presentation of a keyboard comprising a set of keys on the display screen of the user interface;
receiving a selection of a subset of keys of the set of keys that correspond to a set of authentication credential values associated with an authentication credential via the display screen; and
facilitating, via the display screen, a further presentation of the subset of keys in a non-highlighted form of display that corresponds to a non-highlighted form of display of non-selected keys of the set of keys, in response to the selection of the subset of keys to reduce risk of detection of the set of authentication credential values by an unauthorized user identity.

* * * * *